(12) United States Patent
Johnson et al.

(10) Patent No.: US 11,589,500 B2
(45) Date of Patent: Feb. 28, 2023

(54) PARTICLE DELIVERY SYSTEM OF AN AGRICULTURAL ROW UNIT

(71) Applicant: CNH Industrial America LLC, New Holland, PA (US)

(72) Inventors: Chad Michael Johnson, Arlington Heights, IL (US); Brian John Anderson, Yorkville, IL (US); Trevor Philip Stanhope, Oak Lawn, IL (US); Christopher Schoeny, Minooka, IL (US); Kregg Jerome Raducha, Oak Park, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 288 days.

(21) Appl. No.: 16/726,558

(22) Filed: Dec. 24, 2019

(65) Prior Publication Data

US 2021/0185897 A1   Jun. 24, 2021

(51) Int. Cl.
*A01C 7/12*   (2006.01)
*A01C 7/04*   (2006.01)
(Continued)

(52) U.S. Cl.
CPC .............. *A01C 7/127* (2013.01); *A01C 7/04* (2013.01); *A01C 7/102* (2013.01); *A01C 7/163* (2013.01)

(58) Field of Classification Search
CPC ........... A01C 7/127; A01C 7/04; A01C 7/102; A01C 7/12; A01C 7/08; A01C 7/00; A01C 7/10; A01C 7/163; A01C 7/16
See application file for complete search history.

(56) References Cited

U.S. PATENT DOCUMENTS 222,042 A   11/1879  Haworth
285,413 A    9/1883  Johnson
(Continued)

FOREIGN PATENT DOCUMENTS

AU   2012201380 A1   3/2012
BR   122012026494 B1   4/2016
(Continued)

OTHER PUBLICATIONS

Precision Planting, PrecisionMeter A Better Finger Meter, Improve Planter Performance Where it Counts—In the Meter, https://precisionplanting.com/products/product/precisionmeter, Feb. 14, 2019, 8 pages.
(Continued)

*Primary Examiner* — Christopher J. Novosad
(74) *Attorney, Agent, or Firm* — Rebecca Henkel; Rickard DeMille

(57) ABSTRACT

A particle delivery system of an agricultural row unit includes a particle belt having a particle acceleration section. The particle belt is configured to receive a particle from a particle metering and singulation unit, to accelerate the particle at the particle acceleration section, and to expel the particle toward a trench in soil. The particle delivery system includes a first wheel engaged with the particle belt at a first location and a second wheel engaged with the particle belt at a second location. The particle acceleration section extends between the first location and the second location, a substantially no-slip condition exists between the first wheel and the particle belt at the first location and between the second wheel and the particle belt at the second location, and the second wheel is configured to rotate faster than the first wheel to accelerate the particle at the particle acceleration section.

20 Claims, 10 Drawing Sheets

(51) Int. Cl.
  *A01C 7/16* (2006.01)
  *A01C 7/10* (2006.01)

(56) References Cited

U.S. PATENT DOCUMENTS

| | | |
|---|---|---|
| 716,408 A | 12/1902 | Graham |
| 2,646,191 A | 7/1953 | Wechsler |
| 2,852,995 A | 9/1958 | Domries |
| 3,176,636 A | 4/1965 | Wilcox et al. |
| 3,343,507 A | 9/1967 | Smith |
| 3,561,380 A | 2/1971 | Adams, Jr. et al. |
| 3,627,050 A | 12/1971 | Hansen et al. |
| 3,659,746 A | 5/1972 | Winslow |
| 3,913,503 A | 10/1975 | Becker |
| 4,023,509 A | 5/1977 | Hanson |
| 4,026,437 A | 5/1977 | Biddle |
| 4,029,235 A | 6/1977 | Grataloup |
| 4,094,444 A | 6/1978 | Wilis |
| 4,600,122 A | 7/1986 | Lundie et al. |
| 4,628,841 A | 12/1986 | Powilleit |
| 4,928,607 A | 5/1990 | Luigi et al. |
| 5,231,940 A | 8/1993 | Tjeerdsma |
| 5,842,428 A | 12/1998 | Stufflebeam et al. |
| 5,938,071 A | 8/1999 | Sauder |
| 5,992,338 A | 11/1999 | Romans |
| 6,192,813 B1 | 2/2001 | Memory et al. |
| 6,237,514 B1 | 5/2001 | Romans |
| 6,269,758 B1 | 8/2001 | Sauder |
| 6,283,051 B1 | 9/2001 | Yoss |
| 6,332,413 B1 | 12/2001 | Stufflebeamn et al. |
| 6,564,729 B1 | 5/2003 | Petzoldt |
| 6,564,730 B2 | 5/2003 | Crabb et al. |
| 6,581,535 B2 | 6/2003 | Barry et al. |
| 6,615,754 B2 | 9/2003 | Unruh et al. |
| 6,644,225 B2 | 11/2003 | Keaton et al. |
| 6,681,706 B2 | 1/2004 | Sauder et al. |
| 6,748,885 B2 | 6/2004 | Sauder et al. |
| 6,752,095 B1 | 6/2004 | Rylander et al. |
| 6,827,029 B1 | 12/2004 | Wendte et al. |
| 6,863,006 B2 | 3/2005 | Sandoval et al. |
| 7,162,963 B2 | 1/2007 | Sauder et al. |
| 7,273,016 B2 | 9/2007 | Landphair et al. |
| 7,334,532 B2 | 2/2008 | Sauder et al. |
| 7,343,868 B2 | 3/2008 | Stephens et al. |
| 7,377,221 B1 | 5/2008 | Brockmeier et al. |
| 7,448,334 B2 | 11/2008 | Mariman et al. |
| 7,490,565 B2 | 2/2009 | Holly |
| 7,571,688 B1 | 8/2009 | Friestad et al. |
| 7,617,785 B2 | 11/2009 | Wendte |
| 7,631,606 B2 | 12/2009 | Sauder et al. |
| 7,631,607 B2 | 12/2009 | Vandersnick |
| 7,665,409 B2 | 2/2010 | Johnson |
| 7,669,538 B2 | 3/2010 | Memory et al. |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts et al. |
| 7,775,167 B2 | 8/2010 | Stehling et al. |
| 7,918,168 B2 | 4/2011 | Garner et al. |
| 7,938,074 B2 | 5/2011 | Liu |
| 8,074,586 B2 | 12/2011 | Garner et al. |
| 8,078,367 B2 | 12/2011 | Sauder et al. |
| 8,166,896 B2 | 5/2012 | Shoup |
| 8,275,525 B2 | 9/2012 | Kowalchuk et al. |
| 8,276,529 B2 | 10/2012 | Garner et al. |
| 8,281,725 B2 | 10/2012 | Wendte et al. |
| 8,297,210 B2 | 10/2012 | Spiesberger |
| 8,365,679 B2 | 2/2013 | Landphair et al. |
| 8,418,634 B2 | 4/2013 | Shoup |
| 8,418,636 B2 | 4/2013 | Liu et al. |
| 8,448,587 B2 | 5/2013 | Kowalchuk et al. |
| 8,522,699 B2 | 9/2013 | Garner et al. |
| 8,522,889 B2 | 9/2013 | Adams et al. |
| 8,618,465 B2 | 12/2013 | Tevs et al. |
| 8,671,856 B2 | 3/2014 | Garner et al. |
| 8,677,914 B2 | 3/2014 | Stark |
| 8,746,159 B2 | 6/2014 | Garner et al. |
| 8,770,121 B2 | 7/2014 | Bragatto |
| 8,813,663 B2 | 8/2014 | Garner et al. |
| 8,825,310 B2 | 9/2014 | Kowalchuk |
| 8,825,311 B2 | 9/2014 | Kowalchuk |
| 8,843,281 B2 | 9/2014 | Wilhelmi et al. |
| 8,850,995 B2 | 10/2014 | Garner et al. |
| 8,850,997 B2 | 10/2014 | Silbemagel et al. |
| 8,850,998 B2 | 10/2014 | Garner et al. |
| 8,863,676 B2 | 10/2014 | Brockmann et al. |
| 8,869,629 B2 | 10/2014 | Noble et al. |
| 8,869,719 B2 | 10/2014 | Garner et al. |
| 8,893,630 B2 | 11/2014 | Kowalchuk et al. |
| 8,910,582 B2 | 12/2014 | Mariman et al. |
| 8,925,471 B2 | 1/2015 | Adams et al. |
| 8,928,486 B2 | 1/2015 | Hui et al. |
| 8,942,894 B2 | 1/2015 | Gamer et al. |
| 8,942,896 B2 | 1/2015 | Mayerle |
| 8,948,980 B2 | 2/2015 | Gamer et al. |
| 8,985,037 B2 | 3/2015 | Radtke et al. |
| 9,010,258 B1 | 4/2015 | Richard et al. |
| 9,043,950 B2 | 6/2015 | Wendte et al. |
| 9,119,339 B2 | 9/2015 | Bergere |
| 9,137,942 B2 | 9/2015 | Adams et al. |
| 9,144,190 B2 | 9/2015 | Henry et al. |
| 9,148,992 B2 | 10/2015 | Staeter |
| 9,155,242 B2 | 10/2015 | Adams et al. |
| 9,179,594 B2 | 11/2015 | Graham |
| 9,179,595 B2 | 11/2015 | Kormann et al. |
| 9,198,343 B2 | 12/2015 | Mairman et al. |
| 9,216,860 B2 | 12/2015 | Friestad et al. |
| 9,237,687 B2 | 1/2016 | Sauder et al. |
| 9,265,191 B2 | 2/2016 | Sauder et al. |
| 9,277,688 B2 | 3/2016 | Wilhelmi et al. |
| 9,288,937 B2 | 3/2016 | Sauder et al. |
| 9,313,941 B2 | 4/2016 | Garner et al. |
| 9,313,943 B2 | 4/2016 | Zumdome et al. |
| 9,326,441 B2 | 5/2016 | Donadon |
| 9,332,688 B2 | 5/2016 | Zumdome et al. |
| 9,345,188 B2 | 5/2016 | Garner et al. |
| 9,345,189 B2 | 5/2016 | Harmelink et al. |
| 9,351,440 B2 | 5/2016 | Sauder |
| 9,357,689 B2 | 6/2016 | Beck et al. |
| 9,357,692 B2 | 6/2016 | Johnson et al. |
| 9,398,739 B2 | 7/2016 | Silbernagel et al. |
| 9,426,939 B2 | 8/2016 | Zumdome |
| 9,426,940 B2 | 8/2016 | Connors et al. |
| 9,445,539 B2 | 9/2016 | Rans |
| 9,451,740 B2 | 9/2016 | Kowalchuk |
| 9,475,497 B2 | 10/2016 | Henson et al. |
| 9,480,199 B2 | 11/2016 | Garner et al. |
| 9,510,502 B2 | 12/2016 | Garner et al. |
| 9,554,503 B2 | 1/2017 | Noer et al. |
| 9,578,799 B2 | 2/2017 | Allgaier et al. |
| 9,585,304 B2 | 3/2017 | Roberge et al. |
| 9,591,800 B2 | 3/2017 | Kowalchuk et al. |
| 9,596,803 B2 | 3/2017 | Wendte et al. |
| 9,603,298 B2 | 3/2017 | Wendte et al. |
| 9,615,504 B2 | 4/2017 | Sauder et al. |
| 9,622,401 B2 | 4/2017 | Stevenson |
| 9,629,298 B2 | 4/2017 | Dienst |
| 9,635,802 B2 | 5/2017 | Rains et al. |
| 9,635,804 B2 | 5/2017 | Carr et al. |
| 9,648,800 B2 | 5/2017 | Garner et al. |
| 9,648,802 B2 | 5/2017 | Wendte et al. |
| 9,661,799 B2 | 5/2017 | Garner et al. |
| 9,675,002 B2 | 6/2017 | Roszman |
| 9,675,004 B2 | 6/2017 | Landphair et al. |
| 9,686,905 B2 | 6/2017 | Garner et al. |
| 9,686,906 B2 | 6/2017 | Garner et al. |
| 9,693,496 B2 | 7/2017 | Tevs et al. |
| 9,693,498 B2 | 7/2017 | Zumdome et al. |
| 9,699,955 B2 | 7/2017 | Garner et al. |
| 9,706,701 B2 | 7/2017 | Prickel et al. |
| 9,706,702 B2 | 7/2017 | Wendte et al. |
| 9,706,705 B2 | 7/2017 | Czapka et al. |
| 9,723,779 B2 | 8/2017 | Wendte et al. |
| 9,730,377 B2 | 8/2017 | Kowalchuk et al. |

(56) References Cited

U.S. PATENT DOCUMENTS

| | | |
|---|---|---|
| 9,730,379 B2 | 8/2017 | Wendte et al. |
| 9,733,634 B2 | 8/2017 | Prickel et al. |
| 9,750,174 B2 | 9/2017 | Sauder et al. |
| 9,756,778 B2 | 9/2017 | Straeter |
| 9,756,779 B2 | 9/2017 | Wilhelmi et al. |
| 9,763,380 B2 | 9/2017 | Hahn et al. |
| 9,769,978 B2 | 9/2017 | Radtke |
| 9,775,279 B2 | 10/2017 | Garner et al. |
| 9,781,874 B2 | 10/2017 | Johnson et al. |
| 9,795,076 B2 | 10/2017 | Lind et al. |
| 9,795,077 B2 | 10/2017 | Hahn et al. |
| 9,801,332 B2 | 10/2017 | Landphair et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,429 B2 | 11/2017 | Garner et al. |
| 9,826,676 B2 | 11/2017 | Borkgren et al. |
| 9,826,677 B2 | 11/2017 | Gervais et al. |
| 9,832,921 B2 | 12/2017 | Anderson et al. |
| 9,836,036 B2 | 12/2017 | Johnson et al. |
| 9,848,524 B2 | 12/2017 | Sauder et al. |
| 9,848,528 B2 | 12/2017 | Werner et al. |
| 9,854,732 B2 | 1/2018 | Thompson et al. |
| 9,861,025 B2 | 1/2018 | Schaefer et al. |
| 9,861,030 B2 | 1/2018 | Garner et al. |
| 9,861,031 B2 | 1/2018 | Garner et al. |
| 9,867,328 B2 | 1/2018 | Tevs et al. |
| 9,869,571 B2 | 1/2018 | Hoberge et al. |
| 9,883,625 B2 | 2/2018 | Kock et al. |
| 9,883,626 B2 | 2/2018 | Heim et al. |
| 9,888,624 B2 | 2/2018 | Maniar et al. |
| 9,894,830 B2 | 2/2018 | Horsch |
| 9,902,571 B2 | 2/2018 | Hui et al. |
| 9,918,427 B2 | 3/2018 | Anderson et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,943,027 B2 | 4/2018 | Sauder et al. |
| 9,949,426 B2 | 4/2018 | Radtke et al. |
| 9,949,427 B2 | 4/2018 | Schweitzer et al. |
| 9,955,625 B2 | 5/2018 | Baurer et al. |
| 9,961,825 B2 | 5/2018 | Allgaier et al. |
| 9,964,124 B2 | 5/2018 | Maro |
| 9,968,029 B2 | 5/2018 | Funck et al. |
| 9,969,569 B2 | 5/2018 | Borkgren |
| 9,970,490 B2 | 5/2018 | Henry et al. |
| 9,974,230 B2 | 5/2018 | Sauder et al. |
| 9,979,338 B2 | 5/2018 | Dollinger et al. |
| 9,999,174 B2 | 6/2018 | Funck et al. |
| 9,999,175 B2 | 6/2018 | Baurer et al. |
| 10,004,173 B2 | 6/2018 | Garner et al. |
| 10,010,025 B2 | 7/2018 | Dienst et al. |
| 10,028,427 B2 | 7/2018 | Arnett et al. |
| 10,028,428 B2 | 7/2018 | Moorehead et al. |
| 10,028,436 B2 | 7/2018 | Ricketts et al. |
| 10,045,474 B2 | 8/2018 | Bachman et al. |
| 10,045,478 B2 | 8/2018 | Posselius |
| 10,051,782 B2 | 8/2018 | Wilhelmi et al. |
| 10,064,323 B2 | 9/2018 | Hahn et al. |
| 10,085,375 B2 | 10/2018 | Engel et al. |
| 10,091,926 B2 | 10/2018 | Maro |
| 10,104,830 B2 | 10/2018 | Heathcote |
| 10,117,377 B2 | 11/2018 | Dienst et al. |
| 10,123,524 B2 | 11/2018 | Roberge et al. |
| 10,154,622 B2 | 12/2018 | Thompson |
| 10,159,176 B2 | 12/2018 | Baitinger et al. |
| 10,165,724 B2 | 1/2019 | Nilson et al. |
| 10,172,277 B2 | 1/2019 | Thompson |
| 10,188,027 B2 | 1/2019 | Hahn et al. |
| 10,206,325 B2 | 2/2019 | Schoeny et al. |
| 10,206,326 B2 | 2/2019 | Garner et al. |
| 10,225,978 B1 | 3/2019 | Schoeny et al. |
| 10,227,998 B2 | 3/2019 | Lacher et al. |
| 10,231,376 B1 | 3/2019 | Stanhope et al. |
| 10,257,974 B1 | 4/2019 | Schoeny et al. |
| 10,264,723 B2 | 4/2019 | Gresch et al. |
| 10,278,325 B2 | 5/2019 | Anderson et al. |
| 10,296,017 B2 | 5/2019 | Schoeny et al. |
| 10,299,424 B2 | 5/2019 | Hamilton |
| 10,306,824 B2 | 6/2019 | Nelson et al. |
| 10,308,116 B2 | 6/2019 | Czapka et al. |
| 10,337,645 B2 | 7/2019 | Roberge et al. |
| 10,351,364 B2 | 7/2019 | Green et al. |
| 10,368,478 B2 | 8/2019 | Schoeny et al. |
| 10,375,879 B2 | 8/2019 | Garner et al. |
| 10,379,547 B2 | 8/2019 | Thompson et al. |
| 10,408,667 B2 | 9/2019 | Schoeny et al. |
| 10,426,073 B2 | 10/2019 | Totten et al. |
| 10,433,475 B2 | 10/2019 | Gentili et al. |
| 10,448,561 B2 | 10/2019 | Schoeny et al. |
| 10,455,757 B2 | 10/2019 | Sauder et al. |
| 10,455,758 B2 | 10/2019 | Schoeny et al. |
| 10,455,760 B2 | 10/2019 | Stuber et al. |
| 10,462,956 B2 | 11/2019 | Hamilton |
| 10,462,960 B2 | 11/2019 | Duman |
| 10,470,355 B2 | 11/2019 | Renault et al. |
| 10,477,757 B2 | 11/2019 | Schoeny et al. |
| 10,481,617 B2 | 11/2019 | Engel et al. |
| 10,485,154 B2 | 11/2019 | Connell et al. |
| 10,524,409 B2 | 1/2020 | Posselius et al. |
| 10,524,410 B2 | 1/2020 | Schoeny et al. |
| 10,531,606 B2 | 1/2020 | Posselius |
| 10,537,055 B2 | 1/2020 | Gresch et al. |
| 10,548,259 B2 | 2/2020 | Heathcote |
| 10,555,454 B2 | 2/2020 | Garner et al. |
| 10,561,052 B2 | 2/2020 | Barrick et al. |
| 10,575,456 B2 | 3/2020 | Schoeny et al. |
| 10,575,459 B2 | 3/2020 | Gervais et al. |
| 10,575,460 B2 | 3/2020 | Davis et al. |
| 10,582,655 B2 | 3/2020 | Kowalchuk |
| 10,602,656 B2 | 3/2020 | Bartelson et al. |
| 10,645,863 B2 | 5/2020 | Grimm et al. |
| 10,653,056 B2 | 5/2020 | Garner et al. |
| 10,660,261 B2 | 5/2020 | Johnson et al. |
| 10,667,461 B2 | 6/2020 | Kowalchuk et al. |
| 10,709,058 B2 | 7/2020 | Thompson |
| 10,729,054 B2 | 8/2020 | Dekam |
| 10,729,063 B2 | 8/2020 | Garner et al. |
| 10,743,460 B2 | 8/2020 | Gilbert et al. |
| 10,750,658 B2 | 8/2020 | Schoeny et al. |
| 10,750,662 B2 | 8/2020 | Garner et al. |
| 10,750,663 B2 | 8/2020 | Garner et al. |
| 10,757,854 B2 | 9/2020 | Stanhope |
| 10,765,057 B2 | 9/2020 | Radtke et al. |
| 10,768,331 B2 | 9/2020 | Koch et al. |
| 10,772,256 B2 | 9/2020 | Stuber |
| 10,779,456 B2 | 9/2020 | Kowalchuk |
| 10,779,460 B2 | 9/2020 | Pirkenseer |
| 10,779,462 B2 | 9/2020 | Gresch et al. |
| 10,806,062 B2 | 10/2020 | Zemenchik |
| 10,806,070 B2 | 10/2020 | Garner et al. |
| 10,806,071 B2 | 10/2020 | Kowalchuk |
| 10,813,276 B2 | 10/2020 | Heathcote |
| 10,820,464 B2 | 11/2020 | Kowalchuk et al. |
| 10,820,465 B2 | 11/2020 | Kowalchuk et al. |
| 10,820,483 B2 | 11/2020 | Gervais et al. |
| 10,820,485 B2 | 11/2020 | Swanson et al. |
| 10,820,488 B2 | 11/2020 | Schoeny et al. |
| 10,820,489 B2 | 11/2020 | Garner et al. |
| 10,820,490 B2 | 11/2020 | Schoeny et al. |
| 10,823,748 B2 | 11/2020 | Allgaier |
| 10,827,663 B2 | 11/2020 | Gresch et al. |
| 10,827,666 B2 | 11/2020 | Schoeny et al. |
| 10,827,671 B2 | 11/2020 | Kowalchuk et al. |
| 10,827,740 B2 | 11/2020 | Wonderlich et al. |
| 10,842,068 B2 | 11/2020 | Czapka et al. |
| 10,842,072 B2 | 11/2020 | Wilhelmi et al. |
| 10,842,073 B2 | 11/2020 | Garner et al. |
| 10,860,189 B2 | 12/2020 | Allgaier et al. |
| RE48,572 E | 6/2021 | Garner et al. |
| 2009/0292426 A1 | 11/2009 | Nelson et al. |
| 2010/0224110 A1 | 9/2010 | Mariman |
| 2011/0067260 A1 | 3/2011 | Kim et al. |

(56) References Cited

U.S. PATENT DOCUMENTS

| | | |
|---|---|---|
| 2012/0265410 A1 | 10/2012 | Graham et al. |
| 2013/0032363 A1 | 2/2013 | Curry et al. |
| 2014/0277959 A1 | 9/2014 | Wagers et al. |
| 2015/0223392 A1 | 8/2015 | Wilhelmi et al. |
| 2015/0237793 A1 | 8/2015 | Rans |
| 2016/0229575 A1 | 8/2016 | Lapointe |
| 2017/0000008 A1 | 1/2017 | Anderson et al. |
| 2017/0049040 A1 | 2/2017 | Kinzenbaw |
| 2017/0142891 A1 | 5/2017 | Lucas et al. |
| 2017/0156256 A1 | 6/2017 | Allgaier et al. |
| 2017/0339819 A1 | 11/2017 | Kowalchuk et al. |
| 2017/0359949 A1 | 12/2017 | Garner et al. |
| 2018/0014457 A1 | 1/2018 | Mertlich et al. |
| 2018/0035603 A1 | 2/2018 | Kremmer et al. |
| 2018/0035622 A1 | 2/2018 | Gresch et al. |
| 2018/0049367 A1 | 2/2018 | Garner et al. |
| 2018/0110186 A1 | 4/2018 | Bovee |
| 2018/0116102 A1 | 5/2018 | Taylor et al. |
| 2018/0153094 A1 | 6/2018 | Radtke et al. |
| 2018/0168104 A1 | 6/2018 | Johnson et al. |
| 2018/0192577 A1 | 7/2018 | Smith et al. |
| 2018/0224537 A1 | 8/2018 | Taylor et al. |
| 2018/0249621 A1 | 9/2018 | Horsch |
| 2018/0259979 A1 | 9/2018 | Schoeny et al. |
| 2018/0263177 A1 | 9/2018 | Heathcote |
| 2018/0310468 A1 | 11/2018 | Schoeny et al. |
| 2019/0029165 A1 | 1/2019 | Leimkuehler et al. |
| 2019/0075714 A1 | 3/2019 | Koch et al. |
| 2019/0098828 A1 | 4/2019 | Wilhelmi et al. |
| 2019/0116721 A1 | 4/2019 | Donadon et al. |
| 2019/0116722 A1 | 4/2019 | Donadon et al. |
| 2019/0124824 A1 | 5/2019 | Hubner et al. |
| 2019/0141880 A1 | 5/2019 | Zemenchik et al. |
| 2019/0150350 A1 | 5/2019 | Engel et al. |
| 2019/0159398 A1 | 5/2019 | McMenamy et al. |
| 2019/0162164 A1 | 5/2019 | Funk et al. |
| 2019/0183036 A1 | 6/2019 | Leimkuehler et al. |
| 2019/0223372 A1 | 7/2019 | Koch et al. |
| 2019/0230845 A1 | 8/2019 | Buchner et al. |
| 2019/0230846 A1 | 8/2019 | Koch et al. |
| 2019/0230847 A1 | 8/2019 | Forrest et al. |
| 2019/0239425 A1 | 8/2019 | Garner et al. |
| 2019/0246551 A1 | 8/2019 | Campbell et al. |
| 2019/0246552 A1 | 8/2019 | Sauder et al. |
| 2019/0254222 A1 | 8/2019 | Rhodes et al. |
| 2019/0289774 A1 | 9/2019 | Stupa et al. |
| 2019/0289776 A1 | 9/2019 | Rempel et al. |
| 2019/0289778 A1 | 9/2019 | Koch et al. |
| 2019/0289779 A1 | 9/2019 | Koch et al. |
| 2019/0343037 A1 | 11/2019 | Werner et al. |
| 2019/0343038 A1 | 11/2019 | Wilhelmi |
| 2019/0364724 A1 | 12/2019 | Radtke et al. |
| 2019/0373797 A1 | 12/2019 | Schoeny et al. |
| 2019/0373801 A1 | 12/2019 | Schoeny et al. |
| 2019/0380259 A1 | 12/2019 | Frank et al. |
| 2019/0387663 A1 | 12/2019 | Wang et al. |
| 2020/0000003 A1 | 1/2020 | Kowalchuk et al. |
| 2020/0000009 A1 | 1/2020 | Henry et al. |
| 2020/0000011 A1 | 1/2020 | Hebner et al. |
| 2020/0000012 A1 | 1/2020 | Hubner et al. |
| 2020/0000013 A1 | 1/2020 | Rylander et al. |
| 2020/0000016 A1 | 1/2020 | Hubner et al. |
| 2020/0008340 A1 | 1/2020 | Stanhope |
| 2020/0015405 A1 | 1/2020 | Kowalchuk et al. |
| 2020/0015406 A1 | 1/2020 | Wright et al. |
| 2020/0022300 A1 | 1/2020 | Gervais et al. |
| 2020/0045869 A1 | 2/2020 | Stanhope et al. |
| 2020/0045877 A1 | 2/2020 | Riffel et al. |
| 2020/0053955 A1 | 2/2020 | Borkgren et al. |
| 2020/0068778 A1 | 3/2020 | Schoeny et al. |
| 2020/0068788 A1 | 3/2020 | Frank et al. |
| 2020/0100421 A1 | 4/2020 | Wang |
| 2020/0100423 A1 | 4/2020 | Dienst |
| 2020/0107487 A1 | 4/2020 | Antich |
| 2020/0107492 A1 | 4/2020 | Antich |
| 2020/0107493 A1 | 4/2020 | Straeter |
| 2020/0107498 A1 | 4/2020 | Anderson et al. |
| 2020/0113118 A1 | 4/2020 | Stanhope |
| 2020/0113169 A1 | 4/2020 | Jelenkovic et al. |
| 2020/0128724 A1 | 4/2020 | Stoller et al. |
| 2020/0128725 A1 | 4/2020 | Rhodes et al. |
| 2020/0132654 A1 | 4/2020 | Pomedli |
| 2020/0146200 A1 | 5/2020 | Schoeny et al. |
| 2020/0156470 A1 | 5/2020 | Stanhope et al. |
| 2020/0196515 A1 | 6/2020 | Engel |
| 2020/0196520 A1 | 6/2020 | Schoeny et al. |
| 2020/0205337 A1 | 7/2020 | Millie et al. |
| 2020/0214193 A1 | 7/2020 | Shivak |
| 2020/0236842 A1 | 7/2020 | Buehler |
| 2020/0245529 A1 | 8/2020 | Thompson et al. |
| 2020/0245535 A1 | 8/2020 | Schilling et al. |
| 2020/0253107 A1 | 8/2020 | Madison et al. |
| 2020/0260630 A1 | 8/2020 | Stanhope et al. |
| 2020/0260633 A1 | 8/2020 | Kovach et al. |
| 2020/0260634 A1 | 8/2020 | Kovach et al. |
| 2020/0260637 A1 | 8/2020 | Thompson et al. |
| 2020/0267355 A1 | 8/2020 | Mentzer |
| 2020/0267882 A1 | 8/2020 | Mcluckie et al. |
| 2020/0281111 A1 | 9/2020 | Walter et al. |
| 2020/0281112 A1 | 9/2020 | Salowitz et al. |
| 2020/0281182 A1 | 9/2020 | Kiefer et al. |
| 2020/0296882 A1 | 9/2020 | Madison et al. |
| 2020/0315081 A1 | 10/2020 | Plattner |
| 2020/0329627 A1 | 10/2020 | Johnson et al. |
| 2020/0329628 A1 | 10/2020 | Mcluckie et al. |
| 2020/0329631 A1 | 10/2020 | Johnson et al. |
| 2020/0337200 A1 | 10/2020 | Smith |
| 2020/0337209 A1 | 10/2020 | Kowalchuk |
| 2020/0337213 A1 | 10/2020 | Schoeny |
| 2020/0337218 A1 | 10/2020 | Puhalla et al. |
| 2020/0337222 A1 | 10/2020 | Anderson et al. |
| 2020/0337223 A1 | 10/2020 | Snipes et al. |
| 2020/0344943 A1 | 11/2020 | Garner et al. |
| 2020/0344944 A1 | 11/2020 | Wonderlich et al. |
| 2020/0352081 A1 | 11/2020 | Arnett et al. |
| 2020/0352087 A1 | 11/2020 | Garner et al. |
| 2020/0355667 A1 | 11/2020 | Schoeny et al. |
| 2020/0359551 A1 | 11/2020 | Donadon et al. |
| 2020/0359557 A1 | 11/2020 | Utz |
| 2020/0359559 A1 | 11/2020 | Koch et al. |
| 2020/0375079 A1 | 12/2020 | Smith et al. |
| 2020/0375088 A1 | 12/2020 | Utz |
| 2020/0375090 A1 | 12/2020 | Morgan et al. |
| 2020/0383262 A1 | 12/2020 | Schoeny et al. |
| 2020/0387720 A1 | 12/2020 | Stanhope |
| 2020/0390022 A1 | 12/2020 | Stanhope |
| 2020/0390025 A1 | 12/2020 | Schoeny et al. |
| 2020/0390026 A1 | 12/2020 | Walter et al. |
| 2020/0396888 A1 | 12/2020 | Steinke et al. |
| 2020/0396889 A1 | 12/2020 | Kowalchuk |
| 2020/0396896 A1 | 12/2020 | Donadon et al. |
| 2020/0396897 A1 | 12/2020 | Stoller et al. |
| 2020/0404831 A1 | 12/2020 | Kowalchuk et al. |
| 2020/0404832 A1 | 12/2020 | Schoeny et al. |
| 2020/0404833 A1 | 12/2020 | Stanhope et al. |
| 2020/0404837 A1 | 12/2020 | Thompson et al. |
| 2021/0007271 A1 | 1/2021 | Schoeny et al. |
| 2021/0007272 A1 | 1/2021 | Schoeny et al. |

FOREIGN PATENT DOCUMENTS

| | | |
|---|---|---|
| BR | 202016000413 U2 | 10/2017 |
| BR | 202016001378 U2 | 10/2017 |
| BR | 102019000833 A2 | 7/2020 |
| CA | 2291598 C | 2/2007 |
| CN | 2857433 Y | 1/2007 |
| CN | 102763507 A | 11/2012 |
| CN | 203233664 U | 10/2013 |
| CN | 203801244 U | 9/2014 |
| CN | 104956815 A | 10/2015 |
| CN | 105850308 A | 8/2016 |
| CN | 20575541 U | 12/2016 |
| CN | 205993088 U | 3/2017 |
| CN | 106612772 A | 5/2017 |

(56) References Cited

FOREIGN PATENT DOCUMENTS

| | | |
|---|---|---|
| CN | 107087462 A | 8/2017 |
| CN | 108064507 A | 5/2018 |
| CN | 107667630 B | 7/2018 |
| CN | 108243683 A | 7/2018 |
| CN | 207573891 U | 7/2018 |
| CN | 108353582 A | 8/2018 |
| CN | 108650948 A | 10/2018 |
| CN | 108781647 A | 11/2018 |
| CN | 109168453 A | 1/2019 |
| CN | 208317369 U | 1/2019 |
| CN | 109451928 A | 3/2019 |
| CN | 109451931 A | 3/2019 |
| CN | 209314270 U | 8/2019 |
| CN | 209314271 U | 8/2019 |
| CN | 1111406477 A | 7/2020 |
| CN | 111630983 A | 9/2020 |
| CN | 111886974 A | 11/2020 |
| CN | 212393213 U | 1/2021 |
| DE | 3003919 A1 | 8/1981 |
| DE | 3441704 A1 | 5/1986 |
| DE | 202005002495 U1 | 5/2005 |
| DE | 202005005276 U1 | 6/2005 |
| DE | 202008008487 U1 | 8/2008 |
| DE | 102015101256 A1 | 7/2016 |
| DE | 102015121600 A1 | 6/2017 |
| DE | 102016207510 A1 | 11/2017 |
| DE | 102016218859 A1 | 3/2018 |
| DE | 102017203854 A1 | 9/2018 |
| DE | 102017109042 A1 | 10/2018 |
| DE | 102018111584 A1 | 11/2019 |
| DE | 102018112948 A1 | 12/2019 |
| DE | 102018120184 A | 2/2020 |
| DE | 202020102846 U1 | 6/2020 |
| DE | 202020104231 U1 | 7/2020 |
| DE | 102019108987 A1 | 10/2020 |
| DE | 102019118149 A1 | 1/2021 |
| EP | 0237766 A1 | 9/1987 |
| EP | 2374342 B1 | 5/2013 |
| EP | 3127415 A1 | 2/2017 |
| EP | 3135089 A1 | 3/2017 |
| EP | 2853141 B1 | 6/2017 |
| EP | 2974582 B1 | 9/2017 |
| EP | 2901838 B | 11/2017 |
| EP | 2832200 B1 | 5/2018 |
| EP | 3065529 B1 | 5/2018 |
| EP | 3332624 A1 | 6/2018 |
| EP | 3338524 A1 | 6/2018 |
| EP | 2932818 B1 | 8/2018 |
| EP | 3366098 A1 | 8/2018 |
| EP | 3219186 B1 | 11/2018 |
| EP | 3440910 A1 | 2/2019 |
| EP | 3440911 A1 | 2/2019 |
| EP | 2959762 B1 | 5/2019 |
| EP | 3305054 B1 | 7/2019 |
| EP | 3284332 B1 | 10/2019 |
| EP | 3278649 B1 | 11/2019 |
| EP | 3281509 B1 | 11/2019 |
| EP | 3372064 B1 | 2/2020 |
| EP | 3360403 A1 | 4/2020 |
| EP | 3372065 B1 | 4/2020 |
| EP | 3417689 B1 | 4/2020 |
| EP | 3440909 B1 | 4/2020 |
| EP | 3127414 B1 | 5/2020 |
| EP | 3530095 B1 | 9/2020 |
| EP | 3501250 B1 | 11/2020 |
| EP | 3520592 B1 | 12/2020 |
| FR | 2961058 A1 | 12/2011 |
| GB | 1253688 A | 11/1971 |
| GB | 2057835 A | 4/1981 |
| JP | 2005333895 A | 12/2005 |
| JP | 2013027389 A | 2/2013 |
| JP | 6523898 B2 | 6/2019 |
| JP | 6545240 B2 | 7/2019 |
| JP | 6546363 B2 | 7/2019 |
| JP | 2019150070 A | 9/2019 |
| JP | 2019165712 A | 10/2019 |
| RU | 2230446 C1 | 6/2004 |
| RU | 2649332 C1 | 4/2018 |
| WO | 1994026090 A2 | 11/1994 |
| WO | WO2004017712 A1 | 3/2004 |
| WO | 2010088703 A1 | 8/2010 |
| WO | WO2015048867 A1 | 4/2015 |
| WO | WO2016071269 A1 | 5/2016 |
| WO | WO2017004074 A1 | 1/2017 |
| WO | 2017040533 A1 | 3/2017 |
| WO | 2017117638 A1 | 7/2017 |
| WO | 2018013859 A1 | 1/2018 |
| WO | WO2018054624 A1 | 3/2018 |
| WO | WO2018054625 A1 | 3/2018 |
| WO | 2018093568 A2 | 5/2018 |
| WO | WO2019050944 A1 | 3/2019 |
| WO | WO2019079205 A1 | 4/2019 |
| WO | WO2019091732 A1 | 5/2019 |
| WO | WO2019108881 A1 | 6/2019 |
| WO | WO2019197963 A1 | 10/2019 |
| WO | WO2020001964 A1 | 1/2020 |
| WO | WO2020011386 A1 | 1/2020 |
| WO | WO2020016047 A1 | 1/2020 |
| WO | WO2020035337 A1 | 2/2020 |
| WO | WO2020039322 A1 | 2/2020 |
| WO | WO2020046586 A1 | 3/2020 |
| WO | WO2020049387 A1 | 3/2020 |
| WO | WO2020109881 A1 | 6/2020 |
| WO | WO2020161566 A1 | 8/2020 |
| WO | WO2020187380 A1 | 9/2020 |
| WO | WO2020194150 A1 | 10/2020 |
| WO | WO2020227608 A | 11/2020 |
| WO | WO2020240301 A1 | 12/2020 |
| WO | WO2020247985 A1 | 12/2020 |
| WO | WO2021014231 A1 | 1/2021 |

OTHER PUBLICATIONS

Precision Planting, Precision Planting From County Line AG Services, Keeton Seed Firmers, http://countylineag.ohag4u.com/precision_planting.htm, Feb. 8, 2019, 2 pages.

Lamb and Webster, PrecisionMeter, Improve Planter Performance Where it Counts—In the Meter, http://www.lambandwebster.com/precision-planting/precisionmeter/, 2017, 4 pages.

Planterology, SpeedTube, https://planterology.com/solutions/speedtube/, Feb. 12, 2019, 5 pages.

John Deere, John Deere Exactmerge Planter Trench Delivery System and Brushbelt Delivery System, Cross Implement, https://crossimplement.com/news-and-updates/article/2015/06/john-deere-exactemerge-planter-trench-delivery-system-and-brushbelttm-delivery-system, Jun. 11, 2015, 6 pages.

Lamb and Webster, SpeedTube, Focused on the Perfect Plant—and Speed., http://www.lambandwebster.com/precision-planting/speedtube/, 2017, 6 pages.

Precision Planting, PrecisionMeter A Better Finger Meter, Improve Planter Performance Where it Counts—In the Meter, https://www.precisionplanting.com/products/product/precisionmeter, Mar. 7, 2019, 15 pages.

U.S. Appl. No. 16/726,346, filed Dec. 24, 2019, Chad Michael Johnson.

U.S. Appl. No. 16/726,388, filed Dec. 24, 2019, Chad Michael Johnson.

U.S. Appl. No. 16/726,404, filed Dec. 24, 2019, Chad Michael Johnson.

U.S. Appl. No. 16/726,435, filed Dec. 24, 2019, Chad Michael Johnson.

U.S. Appl. No. 16/726,470, filed Dec. 24, 2019, Chad Michael Johnson.

U.S. Appl. No. 16/726,501, filed Dec. 24, 2019, Chad Michael Johnson.

U.S. Appl. No. 16/726,528, filed Dec. 24, 2019, Chad Michael Johnson.

U.S. Appl. No. 16/726,598, filed Dec. 24, 2019, Chad Michael Johnson.

(56) References Cited

OTHER PUBLICATIONS

U.S. Appl. No. 16/726,619, filed Dec. 24, 2019, Chad Michael Johnson.
U.S. Appl. No. 16/726,648, filed Dec. 24, 2019, Chad Michael Johnson.
U.S. Appl. No. 16/726,670, filed Dec. 24, 2019, Chad Michael Johnson.

PARTICLE DELIVERY SYSTEM OF AN AGRICULTURAL ROW UNIT

BACKGROUND

The present disclosure relates generally to a particle delivery system of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube for subsequent delivery to the trench. Certain types of seeds may benefit from a particular spacing along the trench. Additionally, the planting implement having the row units may travel at varying speeds based on the type of seed being deposited into the soil, the type and structure of the soil within the field, and other factors. Typically, the row units output the seeds to the trench at the speed that the implement is traveling through the field, which may affect the spacing between the seeds and may cause the seeds to be deposited at locations along the trench other than target locations (e.g., outside the target locations).

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery system of an agricultural row unit includes a particle belt having a particle acceleration section. The particle belt is configured to receive a particle from a particle metering and singulation unit, to accelerate the particle at the particle acceleration section, and to expel the particle toward a trench in soil. The particle delivery system includes a first wheel engaged with the particle belt at a first location and a second wheel engaged with the particle belt at a second location. The particle acceleration section extends between the first location and the second location, a substantially no-slip condition exists between the first wheel and the particle belt at the first location and between the second wheel and the particle belt at the second location, and the second wheel is configured to rotate faster than the first wheel to accelerate the particle at the particle acceleration section.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
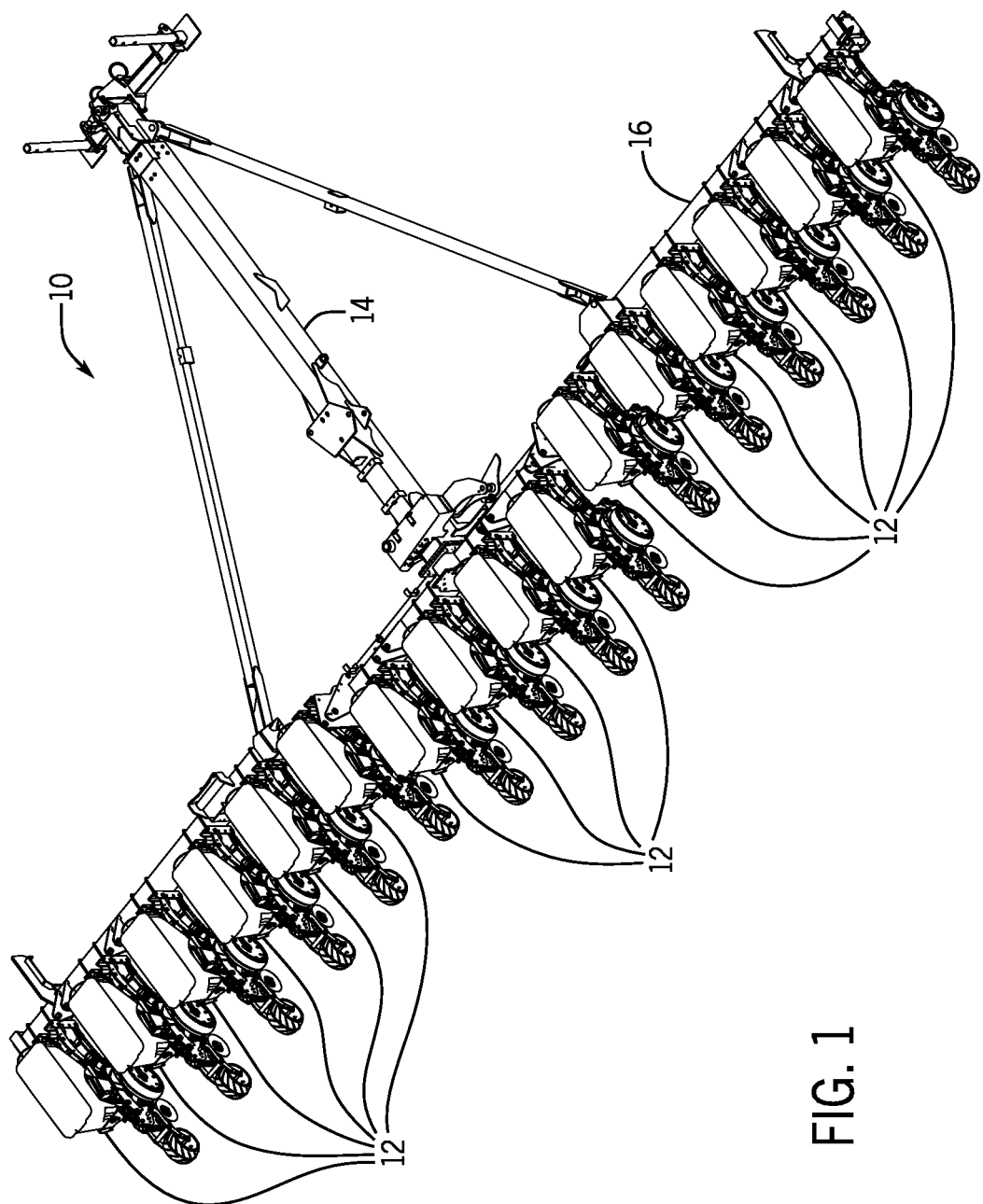
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery system for a row unit of an agricultural implement. Certain agricultural implements include row units configured to deliver particles (e.g., seeds) to trenches in soil. For example, a particle distribution system may transport the particles from a storage tank of the agricultural implement to the row units (e.g., to a hopper assembly of each row unit or directly to a particle delivery system of each row unit), and/or the particles may be delivered from a hopper assembly of each row unit to a respective particle delivery system. Each particle delivery system may output the particles to a respective trench as the agricultural implement travels over the soil. Certain agricultural implements are configured to travel at particular speeds (e.g., between four kilometers per hour (kph) and thirty kph) while delivering the particles to the trenches. Additionally, a particular spacing between the particles when disposed within the soil may enhance plant development and/or yield.

Accordingly, in certain embodiments, at least one row unit of the agricultural implement includes a particle delivery system configured to deliver the particles to the respective trench in the soil at a particular spacing while reducing the relative ground speed of the particles (e.g., the speed of the particles relative to the ground). The particle delivery system includes a particle disc configured to meter individual particles, thereby establishing the particular spacing between particles. The particle disc is configured to release each particle at a release point of the particle disc, thereby enabling the particle to move to a particle engagement section of a particle belt of the particle delivery system. The particle belt includes the particle engagement section, a particle acceleration section, and a particle exit section. The particle belt is configured to receive each particle at the particle engagement section, to accelerate each particle at the particle acceleration section, and to expel each particle toward the trench in the soil at the particle exit section.

In certain embodiments, the particle delivery system may include wheel(s) engaged with the particle belt and configured to rotate at different rotational speeds to stretch the particle belt at the particle acceleration section. For example, the wheels may be engaged with the particle belt, and a substantially no-slip condition may exist between each wheel and the particle belt. As used herein, a substantially no-slip condition refers to a condition in which a rotational speed of the wheel substantially matches a rotational speed of the portion of the particle belt in contact with the wheel, such that there is no slippage between the wheel and the particle belt as the wheel is engaged with and/or drives rotation of the particle belt. For example, the wheels may include protrusions (e.g., cogs) configured to interface with recesses of the particle belt to engage the particle belt and to establish the no slip condition.

In some embodiments, the particle delivery system may include hub assembly(ies) engaged with the particle belt and configured to stretch the particle belt at the particle acceleration section. For example, the hub assemblies may be engaged with the particle belt, and a substantially no-slip condition may exist between each hub assembly and the particle belt. Each hub assembly may include an outer hub configured to rotate, an inner hub disposed eccentrically within the outer hub and configured to rotate with the outer hub, cogs coupled to the inner hub and configured to pivot relative to the inner hub as the inner hub and the outer hub rotate, and guides coupled to the outer hub and configured to pivot relative to the outer hub. Each guide may be configured to slide along the respective cog and along the outer hub as the inner hub and the outer hub rotate, and each cog may be configured to engage the particle belt, such that the rotation of the inner hub and the outer hub and the pivoting of each cog stretches the particle belt.

In certain embodiments, the particle acceleration section of the particle belt may be stretched to accelerate the particle. For example, the particle belt may receive a particle at a particle engagement point disposed at the particle acceleration or before the particle acceleration section, and the particle may accelerate as the particle belt moves the particle along the particle acceleration section, such that a particle exit speed of each particle exiting the particle exit section of the particle belt reaches a target particle exit speed (e.g., after the particle passes through the particle acceleration section and is expelled from the particle belt at the particle exit section). The particle belt may accelerate each particle to a speed greater than a speed resulting from gravitational acceleration alone. As such, the particle delivery system may enable the row unit to travel faster than traditional row units that utilize seed tubes, which rely on gravity to accelerate the particles (e.g., seeds) for delivery to soil. Additionally, the particle belt may accelerate the particles such that the relative ground speed of the particles is reduced, thereby enabling the particle delivery system to accurately deposit the particles within the trench in soil.

With the foregoing in mind, the present embodiments relating to particle delivery systems may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., particle discs) configured to deposit particles (e.g., seeds, fertilizer, and/or other agricultural product(s)) into the particle path/trench. In addition, the row unit 12 may include closing disc(s) and/or a packer wheel positioned behind the particle delivery system. The closing disc(s) are configured to move displaced soil back into the particle path/trench, and the packer wheel is configured to pack soil on top of the deposited particles.

During operation, the agricultural implement 10 may travel at a particular speed along the soil surface while depositing the particles to the trenches. For example, a speed of the agricultural implement may be selected and/or controlled based on soil conditions, a type of the particles delivered by the agricultural implement 10 to the soil, weather conditions, a size/type of the agricultural implement, or a combination thereof. Additionally or alternatively, a particular spacing between the particles when disposed within the soil may enhance plant development and/or yield. Accordingly, in certain embodiments, at least one row unit 12 may include a particle delivery system configured to deposit the particles at the particular spacing while reducing the ground speed of the particles (e.g., as compared to a row unit that employs a particle tube to delivery particles to the soil). As discussed in detail below, the particle delivery system may include a particle metering and singulation unit configured to meter individual particles to establish the spacing between the particles. Additionally, the particle delivery system may include a particle belt configured to receive the particles from the particle metering and singulation unit and to accelerate the particles toward the trench in the soil. For example, a belt speed of the particle belt may be greater than a tangential speed of apertures of the particle disc. The particle belt may accelerate the particles to a speed greater than a speed resulting from gravitational acceleration alone and/or may reduce the relative ground speed of the particles (e.g., the speed of the particles relative to the ground). As such, the particle belt may enable the respective row unit 12 to travel faster than traditional row units that utilize seed tubes, while enabling the row unit 12 to accurately place each particle within the soil of the field.

Figure 2:
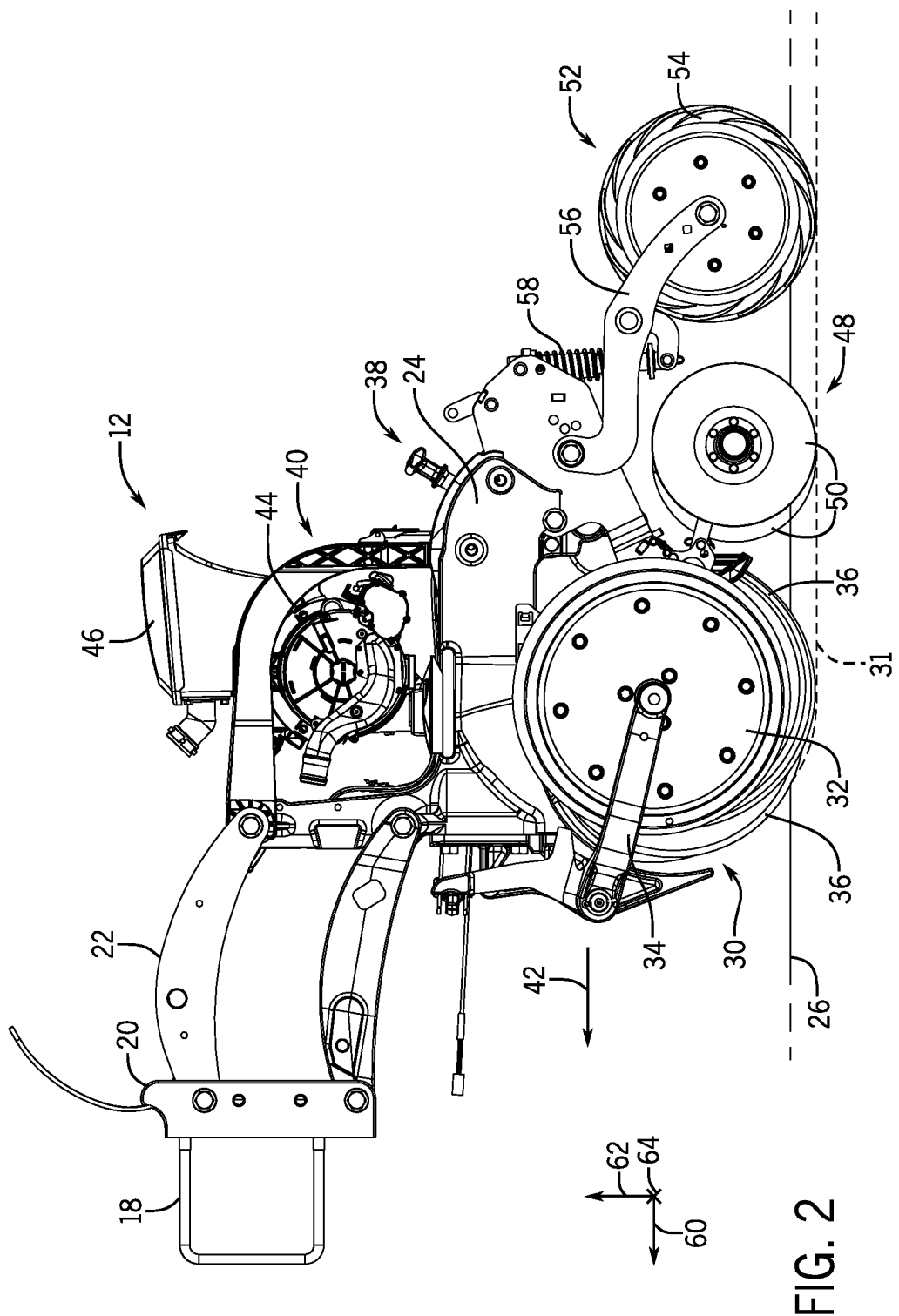
FIG. 2 is a side view of an embodiment of a row unit that may be employed on the agricultural implement of FIG. 1, in accordance with an aspect of the present disclosure.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, a hopper of the hopper assembly may be integrally formed with a housing of the particle metering and singulation unit. The hopper assembly 46 is configured to store the particles for subsequent metering by the particle metering and singulation unit 44. As will be described in greater detail below, in some embodiments, the particle metering and singulation unit 44 includes a particle disc configured to rotate to transfer the particles from the hopper assembly 46 toward a particle belt of the particle delivery system 40. The particle belt may generally be disposed between the particle metering and singulation unit 44 and the trench 31.

The opener assembly 30 and the particle delivery system 40 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby causing the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
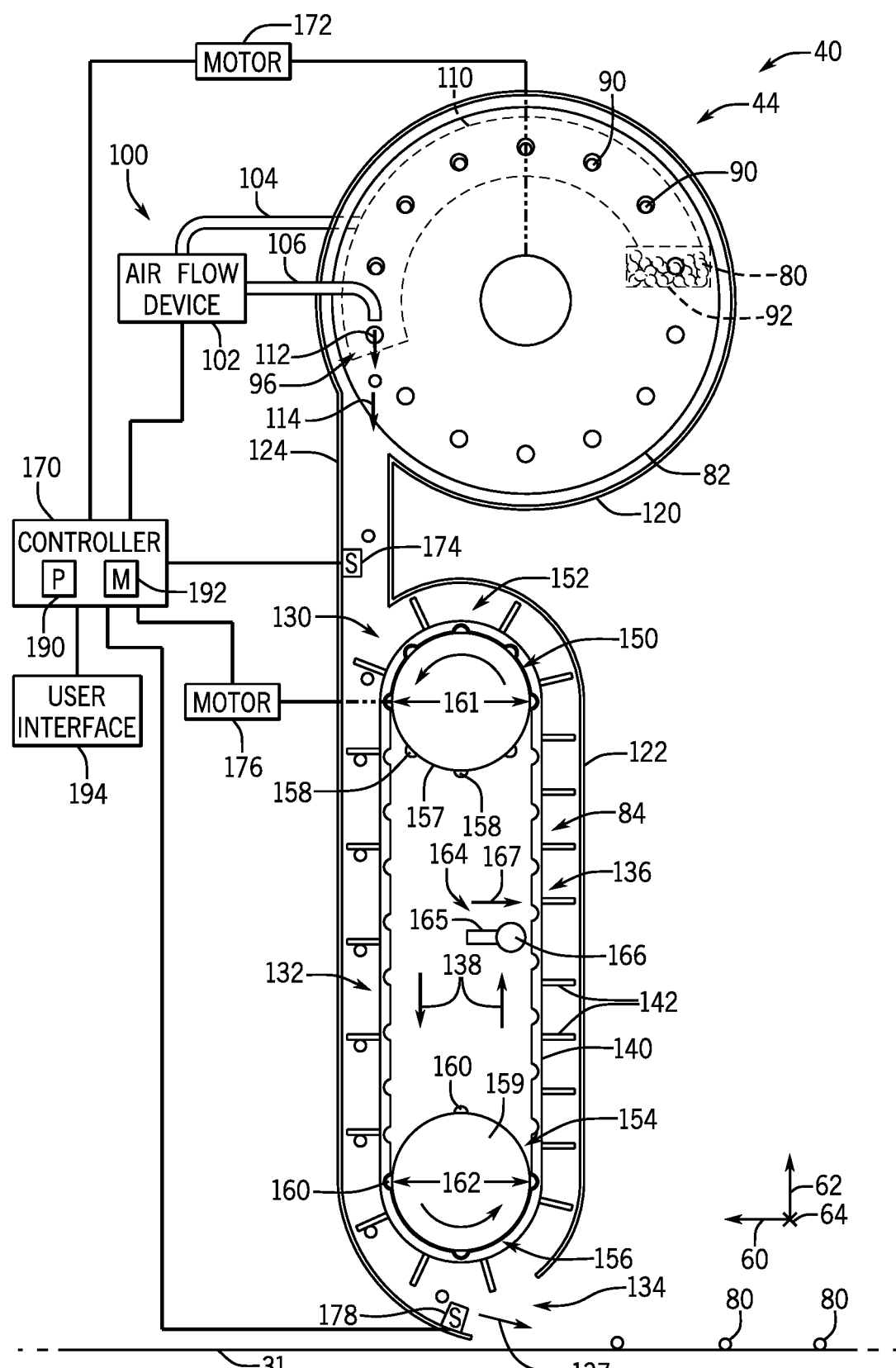
FIG. 3 is a side view of an embodiment of a particle delivery system that may be employed within the row unit of FIG. 2, in accordance with an aspect of the present disclosure.

FIG. 3 is a side view of an embodiment of a particle delivery system 40 that may be employed within the row unit of FIG. 2. As described above, the particle delivery system 40 is configured to meter and accelerate particles 80 (e.g., seeds, fertilizer, other particulate material, or a combination thereof) toward the trench 31 for deposition into the trench 31. In the illustrated embodiment, the particle delivery system 40 includes a particle disc 82 (e.g., of the particle metering and singulation unit 44) configured to meter the particles 80 and a particle belt 84 (e.g., an endless member) configured to accelerate and move the particles 80 toward the trench 31 for deposition into the trench 31.

The particle disc 82 has apertures 90 configured to receive the particles 80 from a particle hopper 92 of the particle delivery system 40. For example, each aperture 90 may receive a single particle 80. The particle hopper 92 is a particle storage area configured to store the particles 80 for subsequent metering and distribution. In certain embodiments, the particle hopper 92 may be coupled to and/or included as part of a housing of the particle metering and singulation unit 44. Furthermore, in some embodiments, the hopper assembly may provide the particles 80 to the particle hopper 92, and/or the hopper assembly (e.g., the hopper of the hopper assembly) may be coupled to the particle hopper 92. The particle disc 82 is configured to rotate, as indicated by arrow 94, to move the particles 80 from the particle hopper 92 to a release point 96, where the particles 80 are released such that the particles 80 move downwardly toward the particle belt 84. The particle belt 84 is configured to rotate, as indicated by arrows 98, to move and expel the particles 80 toward the trench 31. The particle disc 82 having the apertures 90 may be any suitable shape configured to rotate/move to transfer the particles 80 from the particle hopper 92 to the release point 96. For example, the particle disc 82 may be generally flat, may have a curved portion and a flat portion, may be entirely curved, may be a drum, or may include other suitable shapes, geometries, and/or configurations. In certain embodiments, an inner portion of the particle disc 82 may curved/raised related to an outer portion of the particle disc 82 having the apertures 90 (e.g., the particle disc 82 may be generally bowl-shaped), such that the particles 80 may be directed toward the apertures 90 (e.g., away from the raised inner portion and/or toward the flat outer portion) as the particle disc 82 rotates. In some embodiments, the particle disc 82 may be a drum having the apertures 90 disposed along an outer portion and/or an exterior of the drum.

As illustrated, the particle delivery system 40 includes an air flow system 100 having an air flow device 102 (e.g., a vacuum source), a first air tube 104 fluidly coupled to the air flow device 102, and a second air tube 106 fluidly coupled to the air flow device 102. The air flow system 100 is configured to reduce the air pressure within a vacuum passage 110 positioned along a portion of the particle disc 82, thereby drawing the particles 80 from the particle hopper 92 toward and against the apertures 90. As illustrated, the first air tube 104 is fluidly coupled to the air flow device 102 and to the vacuum passage 110. The air flow device 102 is configured to draw air through the apertures 90 aligned with the vacuum passage 110, via the first air tube 104. As the particle disc 82 rotates, the vacuum formed at the apertures 90 secures the particles 80 to the particle disc 82 at the apertures 90, such that the particle disc 82 moves each particle 80 from the particle hopper 92 to the release point 96. At the release point 96, the air flow system 100 provides, via the second air tube 106, an air flow 112 configured to remove each particle 80 from the respective aperture 90 (e.g., by overcoming the vacuum formed at the respective aperture 90). In certain embodiments, the air flow 112 may be omitted, and the particles 80 may be released from the apertures 90 due to the vacuum passage 110 ending. For example, at the release point 96, the vacuum passage 110 may end (e.g., the air flow device 102 may no longer draw air through the apertures 90 of the particle disc 82 at the release point 96), and the particles 80 may no longer be secured in the apertures 90. The particles 80 are released from the particle disc 82 along a release trajectory 114. Rotation of the particle disc 82 imparts a velocity on the particles, and the particles 80 accelerate from the particle disc 82 along the release trajectory 114 under the influence of gravity and/or due to the force applied by the air flow 112. In some embodiments, an angle between the release trajectory 114 and the vertical axis 62 may be zero degrees, one degree, two degrees, five degrees, ten degrees, twenty degrees, or other suitable angles. As used herein, "vacuum" refers to an air pressure that is less than the ambient atmospheric air pressure, and not necessarily 0 pa.

The particle delivery system 40 includes a disc housing 120 and a particle belt housing 122. The particle disc 82 is disposed within and configured to rotate within the disc housing 120. The particle belt 84 is disposed within and configured to rotate within the particle belt housing 122. The vacuum passage 110 of the particle metering and singulation unit 44 is formed within the disc housing 120. Additionally, the particle metering and singulation unit 44 includes the particle disc 82 and the disc housing 120. The particle hopper 92 (e.g., the particle storage area) is formed within the disc housing 120.

Additionally, the particle delivery system 40 includes a particle tube 124 coupled to the disc housing 120 and the particle belt housing 122. The particle tube 124 extends generally from the release point 96 to a particle engagement section 130 of the particle belt 84 and is configured to at least partially direct the particles 80 from the particle disc 82 (e.g., from the release point 96 of the particle disc 82) to the particle belt 84 (e.g., to the particle engagement section 130 of the particle belt 84) along the release trajectory 114. The particle tube may include any suitable shape and/or configuration configured to at least particle direct the particles, such as a channel, a cylindrical tube, a rectangular tube, and/or other suitable shapes/configurations. In certain embodiments, the particle tube may be omitted, such that the particles flow from the release point to the engagement point without guidance from the particle tube.

The particle belt 84 includes the particle engagement section 130, a particle acceleration section 132, a particle exit section 134, and a belt retraction section 136. The particle belt 84 is configured to receive the particles 80 from the particle metering and singulation unit 44 at the particle engagement section 130, to accelerate the particles 80 at and/or along the particle acceleration section 132, and to expel the particles 80 toward the trench 31 along a release trajectory 137 at the particle exit section 134. For example, the particle belt 84 is configured to rotate, as indicated by arrows 138, to move the particles 80 from the particle engagement section 130 to the particle exit section 134. As described in greater detail below, the particle belt 84 is configured to stretch at the particle acceleration section 132 and to retract at the belt retraction section 136. The particle belt 84 includes a base 140 and flights 142 coupled to and extending from the base 140. Each pair of opposing flights 142 is configured to receive a respective particle 80 at the particle engagement section 130 and to move the respective particle 80 to the particle exit section 134.

As described above, the particle disc 82 is configured to meter the particles 80 and to provide a spacing between the particles 80. The spacing between the particles 80 when disposed within the trench 31 may enhance plant development and/or yield. Additionally, the particle delivery system 40 is configured to accelerate the particles 80 generally toward and along the trench 31. The acceleration of the particles 80 by the particle delivery system 40 along the trench may reduce a relative ground speed of the particles 80, as compared to particles output by a seed tube, which relies solely on gravity to accelerate the particles for delivery to soil. For example, the particle delivery system 40 is configured to accelerate the particles 80 using the air flow system 100, gravity, and the particle belt 84. The air flow system 100 is configured to provide the air flow 112 from the second air tube 106 to accelerate the particles 80 along the release trajectory 114 (e.g., the air flow system 100 may apply a force to the particles 80 via the air flow 112). Additionally, the particle delivery system 40 is configured to enable the particles 80 to accelerate under the influence of gravity as the particles 80 travel between the particle disc 82 and the particle belt 84. The particle belt 84 is configured to accelerate the particles 80 received from the particle disc 82, such that a particle exit speed of each particle 80 expelled from the particle belt 84 along the release trajectory 137 reaches a target particle exit speed. The particle exit speed of each particle 80 may reach the target particle exit speed when the particle exit speed is equal to the target particle exit speed, when the particle exit speed becomes greater than or less than the target particle exit speed, when the particle exit speed is within a threshold range of the target particle exit speed (e.g., a difference between the particle exit speed and the target particle exit speed is less than a threshold value associated with the threshold range), or a combination thereof.

The particle delivery system 40 is configured to accelerate the particles 80 at the particle acceleration section 132 of the particle belt 84. Specifically, the particle delivery system 40 includes a first wheel 150 engaged with the particle belt 84 at a first location 152 (e.g., an interface between the first wheel 150 and the particle belt 84) and a second wheel 154 engaged with the particle belt 84 at a second location 156 (e.g., an interface between the second wheel 154 and the particle belt 84). The second wheel 154 is configured to rotate faster than the first wheel 150 to stretch the particle belt 84 at the particle acceleration section 132, thereby accelerating the particles 80 moving along the particle acceleration section 132 and expelled from the particle exit section 134. To enable stretching the particle belt 84 at the particle acceleration section 132, a substantially no-slip condition exists between the first wheel 150 and the particle belt 84 at the first location 152 and between the second wheel 154 and the particle belt 84 at the second location 156. After stretching at the particle acceleration section 132, the particle belt 84 is configured to retract (e.g., at least partially relax) at the belt retraction section 136. The particle belt 84 (e.g., the base 140 and/or the flights 142 of the particle belt 84) may be formed from an elastic material (e.g., fabric, rubber, plastic, or a combination thereof) configured to stretch and/or retract.

As illustrated, the particle engagement section 130 of the particle belt 84 is positioned generally at the first location 152. In certain embodiments, the particle engagement section may be positioned between the first location and the second location, such that the particle belt receives the particles at a stretched portion of the particle belt (e.g., a spacing between flights of the particle belt may be the same at the particle engagement section and the particle acceleration section) or adjacent to the particle retraction section. Additionally, as illustrated, the particle exit section 134 of the particle belt 84 is positioned generally at the second location 156. In certain embodiments, the particle exit section may be positioned between the first location and the second location.

The first wheel 150 and the second wheel 154 are configured to rotate to drive rotation of the particle belt 84. In certain embodiments, only one of the first wheel and the second wheel may be configured to drive rotation of the particle belt. As described in greater detail in reference to FIGS. 4 and 5, the first wheel 150 and the second wheel 154 may be coupled to one another, via a drive mechanism, such that rotation of the first wheel 150 drives rotation of the second wheel 154, and a first rotational speed of the first wheel 150 is proportional to a second rotational speed of the second wheel 154. The first wheel 150 and/or the second wheel 154 may include pulley(s) and/or gear(s).

The first wheel 150 includes an outer peripheral portion 157 (e.g., a first wheel portion) and protrusions 158 (e.g., first protrusions, cogs) extending from the outer peripheral portion 157. Additionally, the second wheel includes an outer peripheral portion 159 (e.g., a second wheel portion) and protrusions 160 (e.g., second protrusions, cogs) extending from the outer peripheral portion 159. Each of the protrusions 158 and 160 is configured to engage a respective recess of the particle belt 84 to provide the no-slip condition between the first wheel 150 and the particle belt 84 at the first location 152 and between the second wheel 154 and the particle belt 84 at the second location 156, respectively.

The number of protrusions 158 and 160 may generally depend on the first expected rotational speed of the first wheel 150, the second expected rotational speed of the second wheel 154, a diameter 161 (e.g., a first diameter) of the first wheel 150, a diameter 162 (e.g., a second diameter) of the second wheel 154, or a combination thereof. For example, the number of protrusions, the rotational speed, and the diameter of the first wheel 150 and the second wheel 154 may each be proportionally related (e.g., as the expected rotational speed of the wheel increases or decreases, the number of protrusions and/or the diameter of the wheel may increase or decrease). As illustrated, the first wheel 150 includes eight protrusions 158, and the second wheel 154 includes four protrusions 160. Additionally, the diameter 161 of the first wheel 150 and the diameter 162 of the second wheel 154 are generally the same. As such, the second wheel 154 rotating faster than (e.g., twice as fast as) the first wheel 150 may stretch the particle belt 84 at the particle acceleration section 132, such that the belt speed of the particle belt 84 at the second location 156 (e.g., at the particle exit section 134) is twice a belt speed of the particle belt 84 at the particle engagement section 130 and/or at the belt retraction section 136. In other embodiments, the number of protrusions, the rotational speed, and the diameter of the first wheel and/or the second wheel may have other values that may increase and/or decrease the belt speed of the particle belt at the particle exit section, thereby increasing and/or decreasing the particle exit speed of the particles. As described in greater detail below, the number of protrusions 158 of the first wheel 150 and the number of protrusions 160 of the second wheel 154 may be selected based on relative diameters of the first wheel 150 and the second wheel 154 (e.g., diameters of first ends of the first wheel 150 and the second wheel 154, which are engaged with the particle belt 84, and diameters of second ends of the first wheel 150 and the second wheel 154, which are engaged with a drive mechanism).

The particle delivery system 40 includes a belt tension assembly 164 configured to at least partially maintain a tension of the particle belt 84 at the belt retraction section 136. For example, at the belt retraction section 136, the particle belt 84 may be more retracted (e.g., more relaxed) relative to the particle acceleration section 132 and/or the particle exit section 134, and the belt tension assembly 164 may provide a force/pressure to the particle belt 84 at the belt retraction section 136 to remove slack from the particle belt 84 and at least partially maintain the tension of the particle belt 84. As illustrated, the belt tension assembly 164 includes a track 165 and a wheel 166 (e.g., a third wheel) coupled to and configured to move along the track 165. The wheel 166 is engaged with the particle belt 84 at the belt retraction section 136 to provide the tension to the belt retraction section 136 of the particle belt 84. For example, the wheel 166 may be biased outwardly toward the particle belt 84, as indicated by arrow 167, to at least partially maintain the tension of the particle belt 84 at the belt retraction section 136. In certain embodiments, the belt tension assembly 164 may include a spring and/or another tension mechanism configured to bias the wheel 166 outwardly along the track 165. In some embodiments, the belt tension assembly, or portions thereof, may be omitted from the particle delivery system. For example, the belt retraction section may remain in tension due to the no-slip conditions between the first wheel and the particle belt at the first location and between the second wheel and the particle belt at the second location. Alternatively, the belt retraction section may not be in tension and may have slack, and/or the belt retraction section may alternate between having slack and being in tension.

The particle delivery system 40 includes a controller 170 configured to control the rotation rate (e.g., the rotational speed) of the particle disc 82 to adjust/control the spacing between the particles 80. For example, the controller 170 may control a first motor 172, which is configured to drive rotation of the particle disc 82, to adjust/control the rotation rate of the particle disc 82 (e.g., by outputting an output signal to the first motor 172 indicative of instructions to adjust the rotation rate of the particle disc 82). Additionally, the controller 170 may control the first motor 172 to achieve a target spacing between the particles 80. The controller 170 may determine the target spacing between the particles 80 based on a type of the particles 80, an input received from a user interface, a ground speed of the row unit, or a combination thereof. The spacing may be any suitable spacing, such as one centimeter, two centimeters, five centimeters, ten centimeters, fifty centimeters, one meter, two meters, five meters, etc. In certain embodiments, the controller 170 may control the rotation rate of the particle disc 82 (e.g., via control of the first motor 172) to achieve the target spacing based on a reference table identifying rotational speeds of the particle disc 82 that will achieve particular spacings, based on an empirical formula, in response to sensor feedback, or a combination thereof.

In certain embodiments, the controller 170 is configured to control the air flow 112 provided by the air flow system 100 to adjust/control a particle transfer speed of each particle 80 expelled from the particle disc 82 (e.g., from the release point 96 of the particle disc 82, along the release trajectory 114, and toward the particle engagement section 130 of the particle belt 84), such that the particle transfer speed reaches a target particle transfer speed at the particle engagement section 130. For example, the controller 170 may control the air flow device 102, which is configured to provide the air flow 112 to accelerate each particle 80 along the release trajectory 114. In certain embodiments, the controller 170 may control a valve configured to adjust a flow rate of the air flow 112. The controller 170 may determine the target particle transfer speed of the particles 80 based on the belt speed of the particle belt 84 and/or the type of the particles 80. The target particle transfer speed may be any suitable speed, such one-tenth kph, one-half kph, one kph, two kph, three kph, five kph, ten kph, fifteen kph, twenty kph, etc. In certain embodiments, the controller 170 may determine the target particle transfer speed as a target percentage of the belt speed of the particle belt 84 (e.g., thirty percent, fifty percent, seventy percent, eighty percent, ninety percent, ninety-five percent, etc.).

To control the air flow 112 provided by the air flow system 100, the controller 170 may receive an input signal indicative of the particle transfer speed of the particle 80 at the particle engagement section 130 of the particle belt 84. For example, the controller 170 may receive the input signal from a particle sensor 174 of the particle delivery system 40 disposed within the particle tube 124. The particle sensor 174 may include an infrared sensor or another suitable type of sensor configured to output the input signal indicative of the particle transfer speed of each particle 80 at the particle engagement section 130. The particle sensor 174 may be positioned a fixed distance from the particle engagement section 130, such that the controller 170 may determine the particle transfer speed of the particle 80 at the particle engagement section 130 based on the fixed distance and the input signal indicative of the particle transfer speed received from the particle sensor 174 (e.g., based on gravitational acceleration of the particle 80 traveling the fixed distance from the particle sensor 174 to the particle engagement section 130 and/or based on acceleration due to the air flow 112).

The controller 170 may compare the particle transfer speed of the particle 80 at the particle engagement section 130 to the target particle transfer speed to determine whether a difference between the particle transfer speed and the target particle transfer speed exceeds a threshold value. In response to determining that the particle transfer speed at the particle engagement section 130 is less than the target particle transfer speed and the difference between the particle transfer speed and the target particle transfer speed exceeds the threshold value, the controller 170 may output an output signal indicative of instructions to increase the flow rate of the air flow 112 provided by the air flow system 100 through the second air tube 106. For example, the controller 170 may output the output signal to the air flow device 102 to cause the air flow device 102 to increase the flow rate of the air flow 112. The increase in the air flow rate may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 130 is greater than the target particle transfer speed and the difference between the particle transfer speed and the target particle transfer speed exceeds the threshold value, the controller 170 may output an output signal indicative of instructions to decrease the flow rate of the air flow 112 provided by the air flow system 100. For example, the controller 170 may output the output signal to the air flow device 102 to cause the air flow device 102 to decrease the flow rate of the air flow 112. The decrease in the air flow rate may decrease the particle transfer speed, such that the particle transfer speed reaches the target particle transfer speed (e.g., such that the difference between the particle transfer speed and the target particle transfer speed is less than the threshold value).

Additionally, the controller 170 is configured to control the belt speed of the particle belt 84 to adjust/control the particle exit speed of the particles 80 expelled from the particle belt 84 (e.g., from the particle exit section 134 of the particle belt 84, along the release trajectory 137, and toward the trench 31), such that the particle exit speed reaches a target particle exit speed. For example, the controller 170 may control the first wheel 150, via a second motor 176 configured to drive rotation of the first wheel 150 and the particle belt 84, to adjust/control the belt speed of the particle belt 84 (e.g., by outputting an output signal to the second motor 176 indicative of instructions to adjust the rotation rate of the first wheel 150), thereby adjusting/controlling the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, the size of the particles 80, an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, sixty percent, seventy percent, eighty percent, ninety percent, ninety-five percent, one hundred percent, etc.).

To control the belt speed of the particle belt 84, the controller 170 may receive an input signal indicative of the particle exit speed of the particle 80 at the particle exit section 134 of the particle belt 84. For example, the controller 170 may receive the input signal from a particle sensor 178 of the particle delivery system 40 disposed adjacent to the particle exit section 134 and along the release trajectory 137. The particle sensor 178 may include an infrared sensor or another suitable type of sensor configured to output the input signal indicative of the particle exit speed of each particle 80 at the particle exit section 134. The particle sensor 178 may be positioned a fixed distance from the particle exit section 134 of the particle belt 84, such that the controller 170 may determine the particle exit speed of the particle 80 at the particle exit section 134 based on the fixed distance and the input signal indicative of the particle exit speed received from the particle sensor 178 (e.g., based on acceleration and/or deceleration of the particle 80 traveling the fixed distance). In certain embodiments, the particle sensor 178 may be configured output a signal indicative of the ground speed of the agricultural row unit to the controller 170, and/or the controller 170 may receive the signal indicative of the ground speed from another source. In some embodiments, the particle sensor 174 and/or the particle sensor 178 may be omitted from the particle delivery system 40. In certain embodiments, the controller 170 may determine other information related to the particles 80 based on feedback from the particle sensor 178, such as skips (e.g., the particle 80 not being present during an expected time period), multiple particles 80 (e.g., multiple particles 80 being present when only a single particle 80 is expected), an amount of particles 80 deposited over a given area (e.g., an amount of particles 80 deposited per acre), and other information related to the particles 80. In some embodiments, the controller 170 may control the particle delivery system based on such feedback.

The controller 170 may compare the particle exit speed of the particle 80 at the particle exit section 134 of the particle belt 84 to the target particle exit speed to determine whether a difference between the particle exit speed and the target particle exit speed exceeds a threshold value. In response to determining that the particle exit speed at the particle exit section 134 of the particle belt 84 is less than the target particle exit speed and the difference between the particle exit speed and the target particle exit speed exceeds the threshold value, the controller 170 may output an output signal indicative of instructions to increase the belt speed of the particle belt 84. For example, the controller 170 may output the output signal to the second motor 176 to cause the second motor 176 to increase the rotation rate of the first wheel 150, thereby increasing the belt speed of the particle belt 84. The increase in the belt speed of the particle belt 84 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 134 of the particle belt 84 is greater than the target particle exit speed and the difference between the particle exit speed and the target particle exit speed exceeds the threshold value, the controller 170 may output an output signal indicative of instructions to decrease the belt speed of the particle belt 84. For example, the controller 170 may output the output signal to the second motor 176 to cause the second motor 176 to decrease the rotation rate of the first wheel 150, thereby decreasing the belt speed of the particle belt 84. The decrease in the belt speed of the particle belt 84 may decrease the particle exit speed, such that the particle exit speed reaches the target particle exit speed (e.g., such that the difference between the particle exit speed and the target particle exit speed is less than the threshold value).

As illustrated, the controller 170 of the particle delivery system 40 includes a processor 190 and a memory 192. The processor 190 (e.g., a microprocessor) may be used to execute software, such as software stored in the memory 192 for controlling the particle delivery system 40 (e.g., for controlling a rotational speed of the particle disc 82, the belt speed of the particle belt 84, and the air flow 112 provided by the air flow system 100). Moreover, the processor 190 may include multiple microprocessors, one or more "general-purpose" microprocessors, one or more special-purpose microprocessors, and/or one or more application specific integrated circuits (ASICS), or some combination thereof. For example, the processor 190 may include one or more reduced instruction set (RISC) or complex instruction set (CISC) processors.

The memory device 192 may include a volatile memory, such as random access memory (RAM), and/or a nonvolatile memory, such as read-only memory (ROM). The memory device 192 may store a variety of information and may be used for various purposes. For example, the memory device 192 may store processor-executable instructions (e.g., firmware or software) for the processor 190 to execute, such as instructions for controlling the particle delivery system 40. In certain embodiments, the controller 170 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the target particle transfer speed and/or the target particle exit speed), instructions (e.g., software or firmware for controlling the particle delivery system 40), and any other suitable data. The processor 190 and/or the memory device 192, and/or an additional processor and/or memory device, may be located in any suitable portion of the system. For example, a memory device for storing instructions (e.g., software or firmware for controlling portions of the particle delivery system 40) may be located in or associated with the particle delivery system 40.

Additionally, the particle delivery system 40 includes a user interface 194 is communicatively coupled to the controller 170. The user interface 194 may be configured to inform an operator of the particle transfer speed and/or the particle exit speed of the particles 80, to enable the operator to adjust the rotational speed of the particle disc 82 and/or the spacing between the particles 80, to enable the operator to adjust the belt speed of the particle belt 84 and/or the air flow 112 provided by the air flow system 100, to provide the operator with selectable options of the type of particles 80, and to enable other operator interactions. For example, the user interface 194 may include a display and/or other user interaction devices (e.g., buttons) configured to enable operator interactions.

Figure 4:
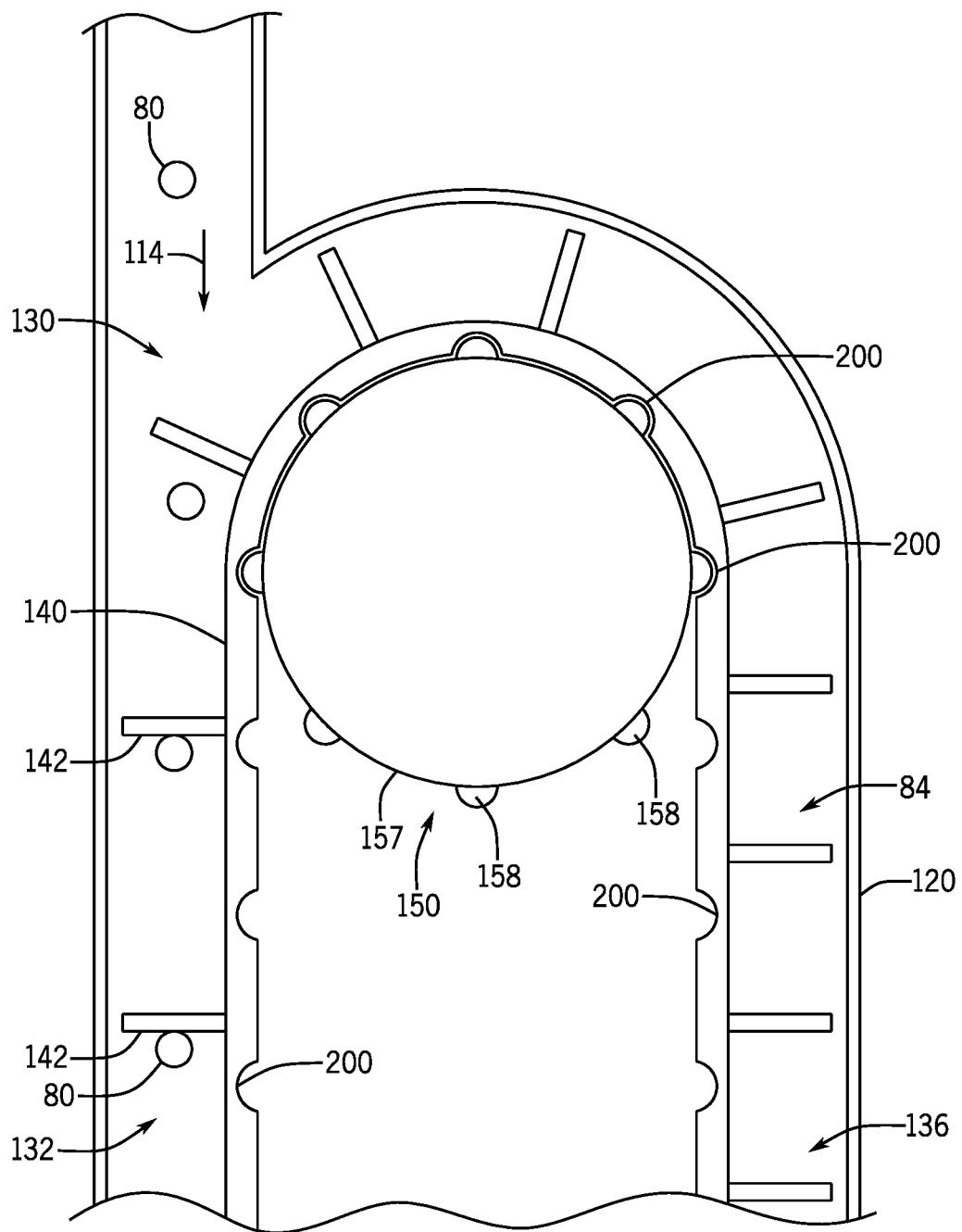
FIG. 4 is a side view of an embodiment a particle belt and a wheel of a particle delivery system that may be employed within the row unit of FIG. 2, in accordance with an aspect of the present disclosure.

FIG. 4 is a side view of an embodiment of the particle belt 84 and the first wheel 150 of the particle delivery system of FIG. 3. As described above, a substantially no-slip condition exists between the particle belt 84 and the first wheel 150 at the first location 152. Additionally, the substantially no-slip condition exists between the second wheel and the particle belt at the second location. The substantially no-slip conditions enable the first wheel 150 and the second wheel rotating at different speeds to stretch the particle belt 84 at the particle acceleration section 132, thereby accelerating the particles 80 at the particle acceleration section 132.

As illustrated, the particle belt 84 has recesses 200 formed along the base 140 and configured to receive the protrusions 158 of the first wheel 150. The interface between the protrusions 158 and the recesses 200 (e.g., the protrusions 158 extending into the recesses 200) provides the no-slip condition at the first location 152. For example, as the first wheel 150 rotates, as indicated by arrow 202, the protrusions 158 may rotate/move at the same speed as the particle belt 84 at the first location 152. As illustrated, the protrusions 158 and the recesses 200 are semi-circles configured to engage one another. In other embodiments, the protrusions and the recesses may be other suitable shapes configured to engage one another (e.g., squares, rectangles, etc.). In certain embodiments, the first wheel and/or the particle belt may include other mechanisms configured to provide the substantially no-slip condition, such as rough surfaces. The protrusions of the second wheel may be shaped similarly to the protrusions 158 of the first wheel 150, such that the protrusions of the second wheel engage the recesses 200 of the particle belt 84 and provide the no-slip condition between the second wheel and the particle belt 84 at the second location.

Figure 5:
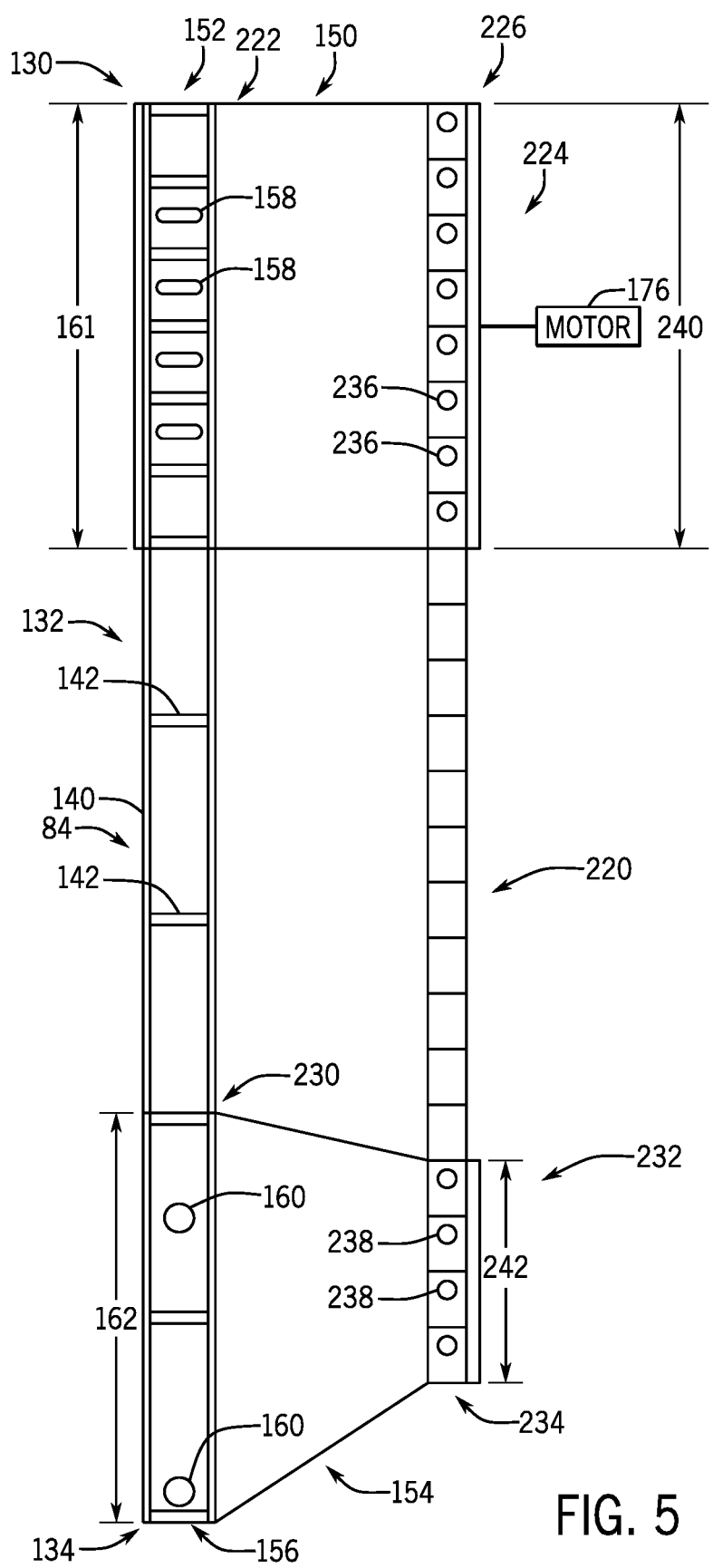
FIG. 5 is a rear view of an embodiment of a particle belt and wheels of a particle delivery system that may be employed within the row unit of FIG. 2, in accordance with an aspect of the present disclosure.

FIG. 5 is a rear view of the particle belt 84, the first wheel 150 engaged with the particle belt 84, the second wheel 154 engaged with the particle belt 84, and a drive mechanism 220 of the particle delivery system. The first wheel 150 includes a first end 222 engaged with the particle belt 84 at the first location 152 and a second end 224 disposed generally opposite the first end 222 and engaged with the drive mechanism 220 at a third location 226. Additionally, the second wheel 154 includes a first end 230 (e.g., a third end) engaged with the particle belt 84 at the second location 156 and a second end 232 (e.g., a fourth end) disposed generally opposite the first end 230 and engaged with the drive mechanism 220 at a fourth location 234.

As described above, the second motor 176 is configured to drive rotation of the first wheel 150. Rotation of the first wheel 150 is configured to drive rotation of the drive mechanism 220, which is configured to drive rotation of the second wheel 154. As illustrated, the drive mechanism 220 is a chain configured to engage protrusions 236 of the first wheel 150 at the second end 224 of the first wheel 150 and to engage protrusions 238 of the second wheel 154 at the second end 232 of the second wheel 154.

The second end 224 of the first wheel 150 has a diameter 240 that is generally equal to the diameter 161 of the first end 222 of the first wheel 150 and generally equal to the diameter 162 of the first end 230 of the second wheel 154. The second end 232 of the second wheel 154 has a diameter 242 that is smaller than the diameter 240 of the second end 224 of the first wheel 150, such that rotation of the drive mechanism 220 by the second end 224 of the first wheel 150 at a first rotational speed drives rotation of the second end 232 of the second wheel 154 at a second rotational speed faster than the first rotational speed. The faster second rotational speed of the second wheel 154 (e.g., at the first end 230 and at the second end 232 of the second wheel 154) relative to the first rotational speed of the first wheel 150 (e.g., at the first end 222 and at the second end 224 of the first wheel 150) causes the second wheel 154 to stretch the particle belt 84 at the particle acceleration section 132, thereby accelerating the particles.

As illustrated, the diameter 240 of the second end 224 of the first wheel 150 is about twice as large as the diameter 242 of the second end 232 of the second wheel 154, such that rotation of the drive mechanism 220 drives rotation of the second wheel 154 at the second rotational speed that is about twice as fast as the first rotational speed of the first wheel 150. In certain embodiments, the diameter of the second end of the first wheel may be larger or smaller relative to the diameter of the second end of the second wheel (e.g., compared to the illustrated embodiment), such that a proportional relationship of the second rotational speed of the second wheel relative to the first rotational speed of the first wheel is different (e.g., the second wheel may rotate three times as fast as the first wheel, the second wheel may rotate four times as fast as the first wheel, the second wheel may rotate eight times as a fast as the first wheel, etc.). The drive mechanism 220 is not stretchable, such that the proportional relationship between the first rotational speed of the first wheel 150 and the second rotational speed of the second wheel 154 is maintained.

Figure 6:
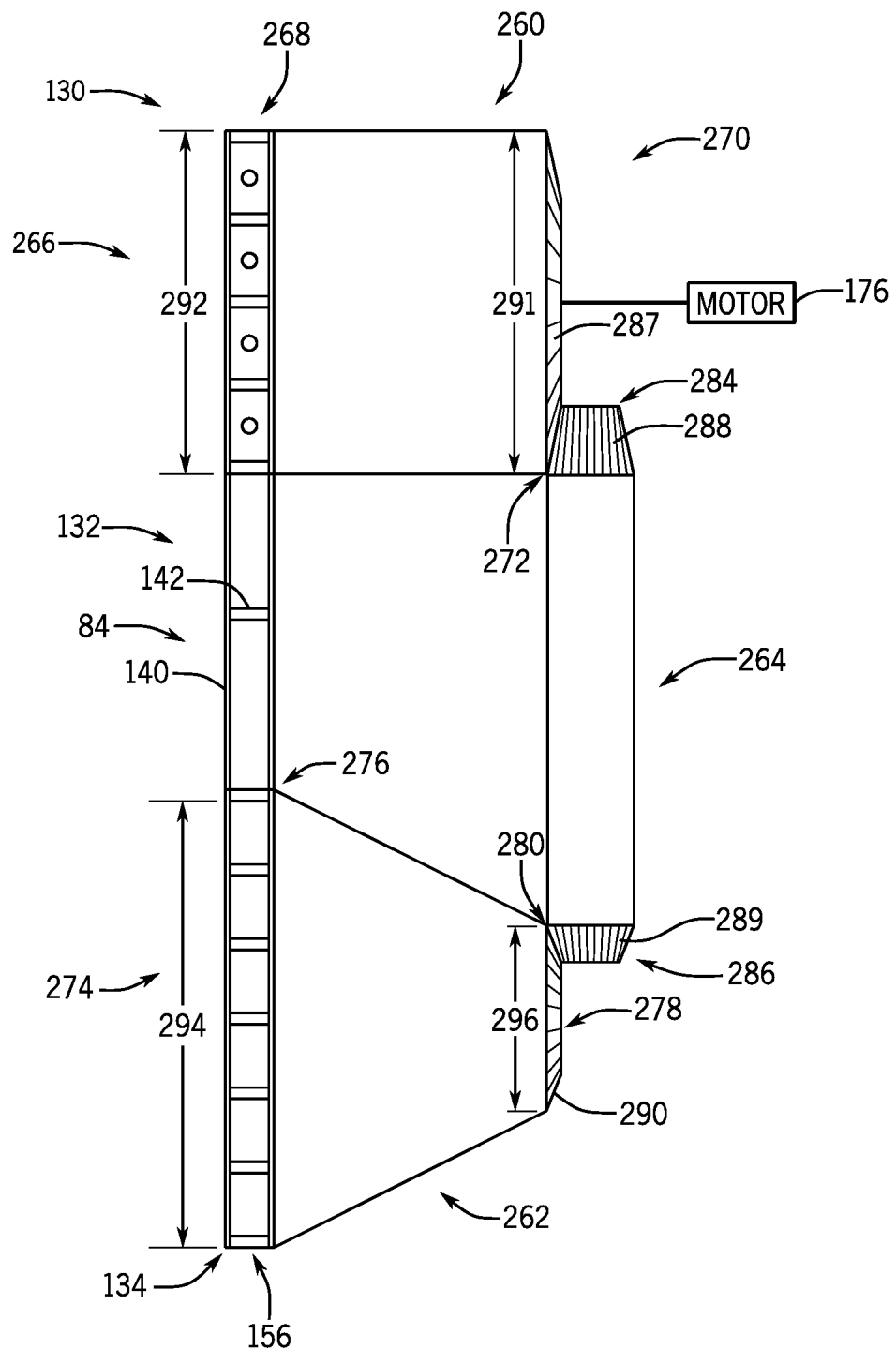
FIG. 6 is a rear view of another embodiment of a particle belt and wheels of a particle delivery system that may be employed within the row unit of FIG. 2, in accordance with an aspect of the present disclosure.

FIG. 6 is a rear view of an embodiment of the particle belt 84, a first wheel 260 engaged with the particle belt 84, a second wheel 262 engaged with the particle belt 84, and a drive mechanism 264 of a particle delivery system that may be employed within the row unit of FIG. 2. The first wheel 260 includes a first end 266 engaged with the particle belt 84 at a first location 268 and a second end 270 disposed generally opposite the first end 266 and engaged with the drive mechanism 264 at a third location 272. Additionally, the second wheel 262 includes a first end 274 (e.g., a third end) engaged with the particle belt 84 at a second location 276 and a second end 278 (e.g., a fourth end) disposed generally opposite the first end 274 and engaged with the drive mechanism 264 at a fourth location 280.

The second motor 176 is configured to drive rotation of the first wheel 260. Rotation of the first wheel 260 is configured to drive rotation of the drive mechanism 264, which is configured to drive rotation of the second wheel 262. As illustrated, the drive mechanism 264 includes a drive shaft having a first end 284 and a second end 286 that are beveled (e.g., the drive mechanism 264 may be a beveled gear). The second end 270 of the first wheel 260 is beveled and is engaged with the first end 284 of the drive mechanism 264 (e.g., grooves 287 of the second end 270 of the first wheel 260 are engaged with grooves 288 of the first end 284 of the drive mechanism 264). Additionally, the second end 278 of the second wheel 262 is beveled and is engaged with the second end 286 of the drive mechanism 264 (e.g., grooves 289 of the second end 278 of the second wheel 262 are engaged with grooves 290 of the second end 286 of the drive mechanism 264).

The second end 270 of the first wheel 260 has a diameter 291 that is generally equal to a diameter 292 of the first end 266 of the first wheel 260 and generally equal to a diameter 294 of the first end 274 of the second wheel 262. The second end 278 of the second wheel 262 has a diameter 296 that is smaller than the diameter 291 of the second end 270 of the first wheel 260, such that rotation of the drive mechanism 264 by the second end 270 of the first wheel 260 at a first rotational speed drives rotation of the second end 278 of the second wheel 262 at a second rotational speed faster than the first rotational speed. The faster second rotational speed of the second wheel 262 (e.g., at the first end 274 and at the second end 278 of the second wheel 262) relative to the first rotational speed of the first wheel 260 (e.g., at the first end 266 and at the second end 270 of the first wheel 260) causes the second wheel 262 to stretch the particle belt 84 at the particle acceleration section 132, thereby accelerating the particles.

As illustrated, the diameter 291 of the second end 270 of the first wheel 260 is about twice as large as the diameter 296 of the second end 278 of the second wheel 262, such that rotation of the drive mechanism 264 drives rotation of the second wheel 262 at the second rotational speed that is about twice as fast as the first rotational speed of the first wheel 260. In certain embodiments, the diameter of the second end of the first wheel may be larger or smaller relative to the diameter of the second end of the second wheel (e.g., compared to the illustrated embodiment), such that a proportional relationship of the second rotational speed of the second wheel relative to the first rotational speed of the first wheel is different (e.g., the second wheel may rotate three times as fast as the first wheel, the second wheel may rotate four times as fast as the first wheel, the second wheel may rotate eight times as a fast as the first wheel, etc.).

In certain embodiments, the particle delivery system may include a third motor coupled to and configured to drive rotation of the second wheel independent of the first wheel. For example, the controller may be communicatively coupled to the third motor, such that the controller may control rotation of the second wheel independent of the first wheel. In such embodiments, the drive mechanism coupling the first wheel and the second wheel may be omitted.

Figure 7:
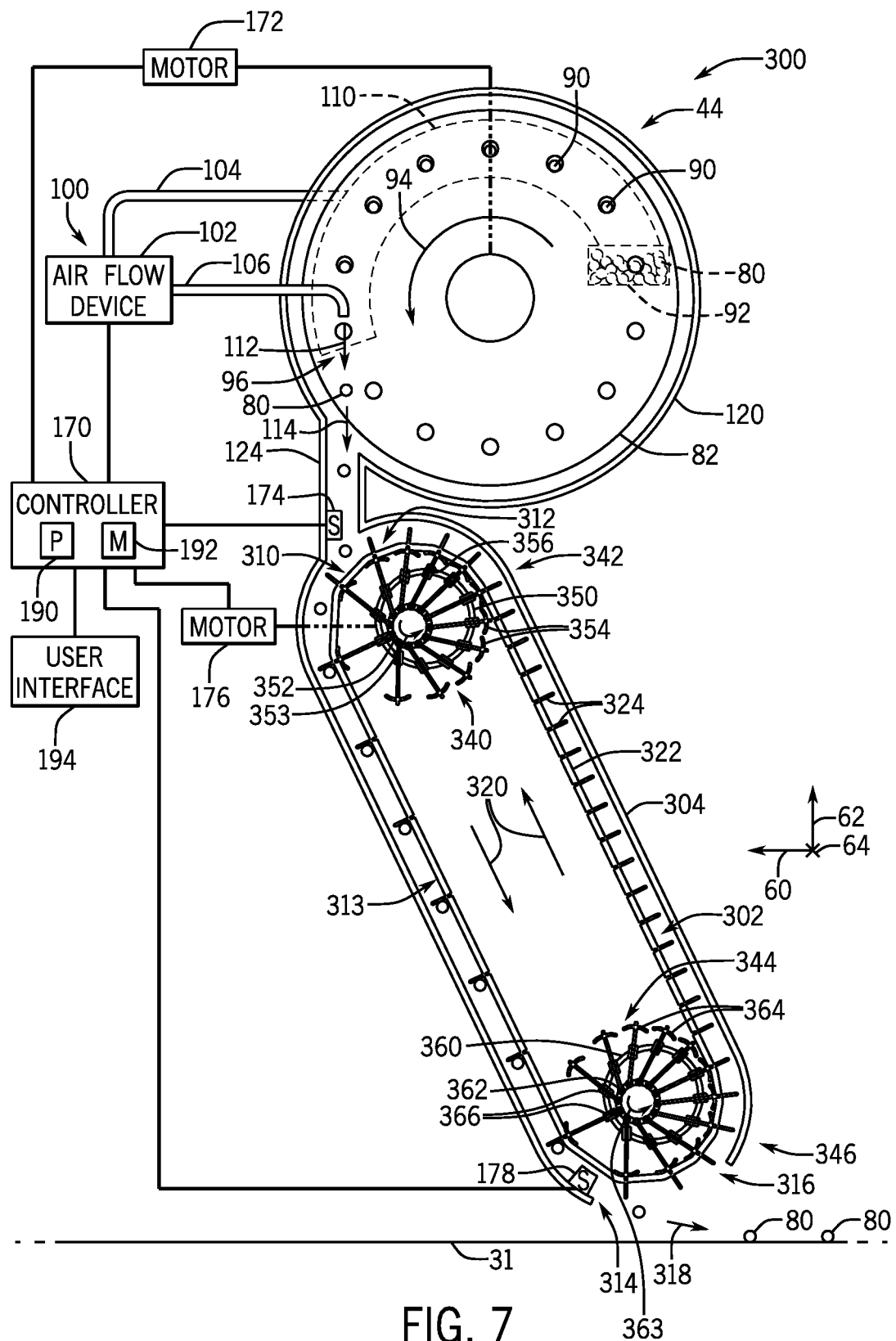
FIG. 7 is a side view of another embodiment of a particle delivery system that may be employed within the row unit of FIG. 2, in accordance with an aspect of the present disclosure.

FIG. 7 is a side view of another embodiment of a particle delivery system 300 that may be employed within the row unit of FIG. 2. As illustrated, the particle delivery system 300 includes the particle metering and singulation unit 44, which includes the particle disc 82, configured to meter and establish the spacing between the particles 80. The particle delivery system 300 also includes a particle belt 302 (e.g., an endless member) configured to receive the particles 80 from the particle disc 82 and to expel the particles 80 into the trench 31. Additionally, the particle delivery system 300 includes the air flow system 100 configured to provide the vacuum along the vacuum passage 110 adjacent to the particle disc 82 and/or to remove the particles 80 from the particle disc 82 and accelerate the particles 80 along the release trajectory 114 via the air flow 112.

The particle delivery system 300 includes a particle belt housing 304. The particle belt 302 is disposed within and configured to rotate within the particle belt housing 304. Additionally, the particle delivery system 40 includes the particle tube 124 coupled to the disc housing 120 and the particle belt housing 304. The particle tube 124 extends generally from the release point 96 to a particle engagement point 310 of the particle belt 302 and is configured to at least partially direct the particles 80 from the particle disc 82 (e.g., from the release point 96 of the particle disc 82) to the particle belt 302 (e.g., to the particle engagement point 310 of the particle belt 302) along the release trajectory 114. In certain embodiments, the particle tube may be omitted, such that the particles flow from the release point to the engagement point without guidance from the particle tube.

The particle belt 302 includes a particle acceleration section 312, a particle transfer section 313, a particle exit section 314, and a belt retraction section 316. The particle belt 302 is configured to receive the particles 80 from the particle metering and singulation unit 44 at the particle engagement point 310, to accelerate the particles 80 at and/or along the particle acceleration section 312, to transfer the particles 80 from the particle acceleration section 312 to the particle exit section 314 at and/or along the particle transfer section 313, and to expel the particles 80 toward the trench 31 at and/or along a release trajectory 318 at the particle exit section 314. For example, the particle belt 84 is configured to rotate, as indicated by arrows 320, to move the particles 80 from the particle engagement point 310 to the particle exit section 314. As described in greater detail below, the particle belt 84 is configured to stretch at the particle acceleration section 312 and to retract at the belt retraction section 316. The particle belt 84 includes a base 322 and flights 324 coupled to and extending from the base 322. Each pair of opposing flights 324 is configured to receive a respective particle 80 at the particle engagement point 310 and to move the respective particle 80 to the particle exit section 314.

The particle belt 302 is configured to accelerate the particles 80 received from the particle disc 82, such that a particle exit speed of each particle 80 expelled from the particle belt 84 along the release trajectory 318 reaches a target particle exit speed (e.g., at the particle exit section 314). The particle exit speed of each particle 80 may reach the target particle exit speed when the particle exit speed is equal to the target particle exit speed, when the particle exit speed becomes greater than or less than the target particle exit speed, when the particle exit speed is within a threshold range of the target particle exit speed (e.g., a difference between the particle exit speed and the target particle exit speed is less than a threshold value associated with the threshold range), or a combination thereof.

The particle delivery system 300 is configured to accelerate the particles 80 at the particle acceleration section 312 of the particle belt 302. In the illustrated embodiment, the particle delivery system 40 includes a first hub assembly 340 engaged with the particle belt 302 at a first location 342 (e.g., an interface or a series of interfaces between the first hub assembly 340 and the particle belt 302) and a second hub assembly 344 engaged with the particle belt 302 at a second location 346 (e.g., an interface or a series of interfaces between the second hub assembly 344 and the particle belt 302). The first hub assembly 340 is configured to stretch (e.g., gradually stretch) the particle belt 302 at/along the first location 342, to remain stretch at/along the particle transfer section 313, and the second hub assembly 344 is configured to retract (e.g., gradually retract/relax) the particle belt 302 at/along the second location 346, such that the particle belt 302 stretches along the particle acceleration section 312 (e.g., at and/or along the first location 342), thereby facilitating acceleration of the particles 80 at the particle acceleration section 312. To enable stretching the particle belt 302 at the particle acceleration section 312 and at the particle transfer section 313, a substantially no-slip condition exists between the first hub assembly 340 and the particle belt 302 at the first location 342 and between the second hub assembly 344 and the particle belt 302 at the second location 346. After stretching at the particle acceleration section 312, the particle belt 302 is configured to retract (e.g., at least partially relax) at the belt retraction section 316 (e.g., at and/or along the second location 346). The particle belt 302 (e.g., the base 322 and/or the flights 324 of the particle belt 302) may be formed from an elastic material (e.g., fabric, rubber, plastic, or a combination thereof) configured to stretch and/or retract. As illustrated, the particle transfer section 313 extends generally between the first location 342 and the second location 346 and between the particle acceleration section 312 and the particle exit section 314. In certain embodiments, the particle transfer section may include at least a portion of the particle acceleration section and/or at least a portion of the particle exit section.

The first hub assembly 340 includes an outer hub 350 (e.g., a first outer hub) and an inner hub 352 (e.g., a first inner hub) disposed eccentrically within the outer hub 350 (e.g., off center relative to the outer hub 350). The outer hub 350 and the inner hub 352 are configured to rotate, as indicated by arrow 353. In certain embodiments, the outer hub 350 and the inner hub 352 may rotate at the same rotation rate (e.g., rotations per minute (rpm)). For example, the outer hub 350 and the inner hub 352 may be non-rotatably coupled, such that rotation of the outer hub 350 drives rotation of the inner hub 352. In certain embodiments, rotation of the inner hub may drive rotation of the outer hub. In some embodiments, motor(s) may drive the inner hub and the outer hub to rotate independently at the same rotation rate.

The first hub assembly 340 includes cogs 354 (e.g., first cogs) coupled to the inner hub 352 and configured to pivot relative to the inner hub 352 as the outer hub 350 and the inner hub 352 rotate. Additionally, the first hub assembly 340 includes guides 356 (e.g., first guides) coupled to and configured to pivot relative to the outer hub 350. For example, each guide 356 is configured to slide along a respective cog 354 (e.g., each cog 354 extends through a respective guide 356) and to pivot relative to the outer hub 350 as the outer hub 350 and the inner hub 352 rotate. Each cog 354 is configured to engage the particle belt 302 at the first location 342, such that rotation of the outer hub 350 and the inner hub 352 and the pivoting of each cog 354 stretch (e.g., gradually stretch) the particle belt 302 at the first location 342. As described in greater detail below in reference to FIG. 8, the inner hub 352 disposed eccentrically within the outer hub 350 causes the cogs 354 to stretch the particle belt 302 as the particle belt 302 moves along the first location 342 and as the outer hub 350 and the inner hub 352 rotate, as indicated by arrow 353.

The second hub assembly 344 includes an outer hub 360 (e.g., a second outer hub) and an inner hub 362 (e.g., a second inner hub) disposed eccentrically within the outer hub 360 (e.g., off center relative to the outer hub 360). The outer hub 360 and the inner hub 362 are configured to rotate, as indicated by arrow 363. In certain embodiments, the outer hub 360 and the inner hub 362 may rotate at the same rotation rate (e.g., rotations per minute (rpm)). For example, the outer hub 360 and the inner hub 362 may be non-rotatably coupled, such that rotation of the outer hub 360 drives rotation of the inner hub 362. In some embodiments, the outer hub 350 of the first hub assembly 340 may be coupled to the outer hub 360 of the second hub assembly 344 via a drive mechanism, such as the drive mechanism of FIG. 4 or the drive mechanism of FIG. 5, thereby causing rotation of the first hub assembly 340 (e.g., rotation of the outer hub 350) to drive rotation of the second hub assembly 344 (e.g., rotation of the outer hub 360). In certain embodiments, rotation of the inner hub may drive rotation of the outer hub. In some embodiments, the inner hub of the first hub assembly may be coupled to the inner hub of the second hub assembly via the drive mechanism, thereby causing rotation of the first hub assembly (e.g., rotation of the inner hub of the first hub assembly) to drive rotation of the second hub assembly (e.g., rotation of the inner hub of the second hub assembly). In certain embodiments, the outer hub and/or the inner hub of the second hub assembly may be driven to rotate by motor(s), which may facilitate independent control of rotation speeds of the first hub assembly and the second hub assembly.

The second hub assembly 344 includes cogs 364 (e.g., second cogs) coupled to the inner hub 362 and configured to pivot relative to the inner hub 362 as the outer hub 360 and the inner hub 362 rotate. Additionally, the second hub assembly 344 includes guides 366 (e.g., second guides) coupled to and configured to pivot relative to the outer hub 360. For example, each guide 366 is configured to slide along a respective cog 364 (e.g., each cog 364 extends through a respective guide 366) and to pivot relative to the outer hub 360 as the outer hub 360 and the inner hub 362 rotate. Each cog 364 is configured to engage the particle belt 302 at the second location 346, such that rotation of the outer hub 360 and the inner hub 362 and the pivoting of each cog 364 retract (e.g., gradually retract and/or gradually relax) the particle belt 302 at the second location 346. The inner hub 362 disposed eccentrically within the outer hub 360 causes the cogs 364 to retract the particle belt 302 as the particle belt 302 moves along the second location 346 and as the outer hub 360 and the inner hub 362 rotate, as indicated by arrow 363. In certain embodiments, the second hub assembly may be replaced by a wheel configured to engage the particle belt at the second location via a no-slip condition, such as the second wheel described above in reference to FIG. 3. Alternatively, the first hub assembly may be replaced by a wheel configured to engage the particle belt at the first location via a no-slip condition, such as the first wheel described above in reference to FIG. 3.

As illustrated, the particle engagement point 310 of the particle belt 302 is positioned generally at the first location 342 and at the particle acceleration section 312. In certain embodiments, the particle engagement point may be positioned between the first location and the second location, such that the particle belt is configured to receive the particles at a stretched portion of the particle belt (e.g., at the particle transfer section) or adjacent to the particle retraction section. Additionally, as illustrated, the particle exit section 314 of the particle belt 302 is positioned generally at the second location 346. In certain embodiments, the particle exit section may be positioned between the first location and the second location.

The first hub assembly 340 and the second hub assembly 344 are configured to rotate to drive rotation of the particle belt 302. For example, the outer hub 350 and the inner hub 352 of the first hub assembly 340 may drive rotation of the cogs 354, and the cogs 354 may engage the particle belt 302 at the first location 342, thereby driving rotation of the particle belt 302. The outer hub 360 and the inner hub 362 of the second hub assembly 344 may drive rotation of the cogs 364, and the cogs 364 may engage the particle belt 302 at the second location 346, thereby driving rotation of the particle belt 302. At least one of the outer hub 350 of the first hub assembly 340, the inner hub 352 of the first hub assembly 340, the outer hub 360 of the second hub assembly 344, and the inner hub 362 of the second hub assembly 344 may include a pulley or a gear. In certain embodiments, only one of the first hub assembly and the second hub assembly may drive rotation of the particle belt.

The controller 170 is configured to control the belt speed of the particle belt 302 to adjust/control the particle exit speed of the particles 80 expelled from the particle belt 302 (e.g., from the particle exit section 314 of the particle belt 302, along the release trajectory 318, and toward the trench 31), such that the particle exit speed reaches a target particle exit speed. For example, the controller 170 may control the outer hub 350 of the first hub assembly 340, via the second motor 176 configured to drive rotation of the outer hub 350 and the particle belt 302, to adjust/control the belt speed of the particle belt 302 (e.g., by outputting an output signal to the second motor 176 indicative of instructions to adjust the rotation rate of the outer hub 350 of the first hub assembly 340), thereby adjusting/controlling the particle exit speed of the particles 80. In certain embodiments, the second motor may be configured to drive rotation of the inner hub of the first hub assembly, and the controller may output an output signal to the second motor indicative of instructions to adjust the rotation rate of the inner hub of the first hub assembly. In some embodiments, the second motor may be configured to drive rotation of the outer hub and/or the inner hub of the second hub assembly, and the controller may output an output signal to the second motor indicative of instructions to adjust the rotation rate of the outer hub and/or the inner hub of the second hub assembly. In certain embodiments, the particle delivery system may include a third motor configured to drive rotation of the second hub assembly independent of the first hub assembly.

The controller 170 may control the particle exit speed of the particles 80, such that the particle exit speed reaches the target particle exit speed. The controller 170 may determine the target particle exit speed of the particles 80 based on the type of the particles 80, the size of the particles 80, an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, sixty percent, seventy percent, eighty percent, ninety percent, ninety-five percent, one hundred percent, etc.).

To control the belt speed of the particle belt 302, the controller 170 may receive an input signal indicative of the particle exit speed of the particle 80 at the particle exit section 314 of the particle belt 302. For example, the controller 170 may receive the input signal from the particle sensor 178 of the particle delivery system 300 disposed adjacent to the particle exit section 314 and along the release trajectory 318. The particle sensor 178 may include an infrared sensor or another suitable type of sensor configured to output the input signal indicative of the particle exit speed of each particle 80 at the particle exit section 314. The particle sensor 178 may be positioned a fixed distance from the particle exit section 314 of the particle belt 302, such that the controller 170 may determine the particle exit speed of the particle 80 at the particle exit section 314 based on the fixed distance and the input signal indicative of the particle exit speed received from the particle sensor 178 (e.g., based on acceleration and/or deceleration of the particle 80 traveling the fixed distance). In some embodiments, the particle sensor 174 and/or the particle sensor 178 may be omitted from the particle delivery system 300.

The controller 170 may compare the particle exit speed of the particle 80 at the particle exit section 314 of the particle belt 302 to the target particle exit speed to determine whether a difference between the particle exit speed and the target particle exit speed exceeds a threshold value. In response to determining that the particle exit speed at the particle exit section 314 of the particle belt 302 is less than the target particle exit speed and the difference between the particle exit speed and the target particle exit speed exceeds the threshold value, the controller 170 may output an output signal indicative of instructions to increase the belt speed of the particle belt 302. For example, the controller 170 may output the output signal to the second motor 176 to cause the second motor 176 to increase the rotation rate of the outer hub 350 of the first hub assembly 340, thereby increasing the belt speed of the particle belt 302. The increase in the belt speed of the particle belt 302 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 314 of the particle belt 302 is greater than the target particle exit speed and the difference between the particle exit speed and the target particle exit speed exceeds the threshold value, the controller 170 may output an output signal indicative of instructions to decrease the belt speed of the particle belt 302. For example, the controller 170 may output the output signal to the second motor 176 to cause the second motor 176 to decrease the rotation rate of the outer hub 350 of the first hub assembly 340, thereby decreasing the belt speed of the particle belt 302. The decrease in the belt speed of the particle belt 302 may decrease the particle exit speed, such that the particle exit speed reaches the target particle exit speed (e.g., such that the difference between the particle exit speed and the target particle exit speed is less than the threshold value).

Figure 8:
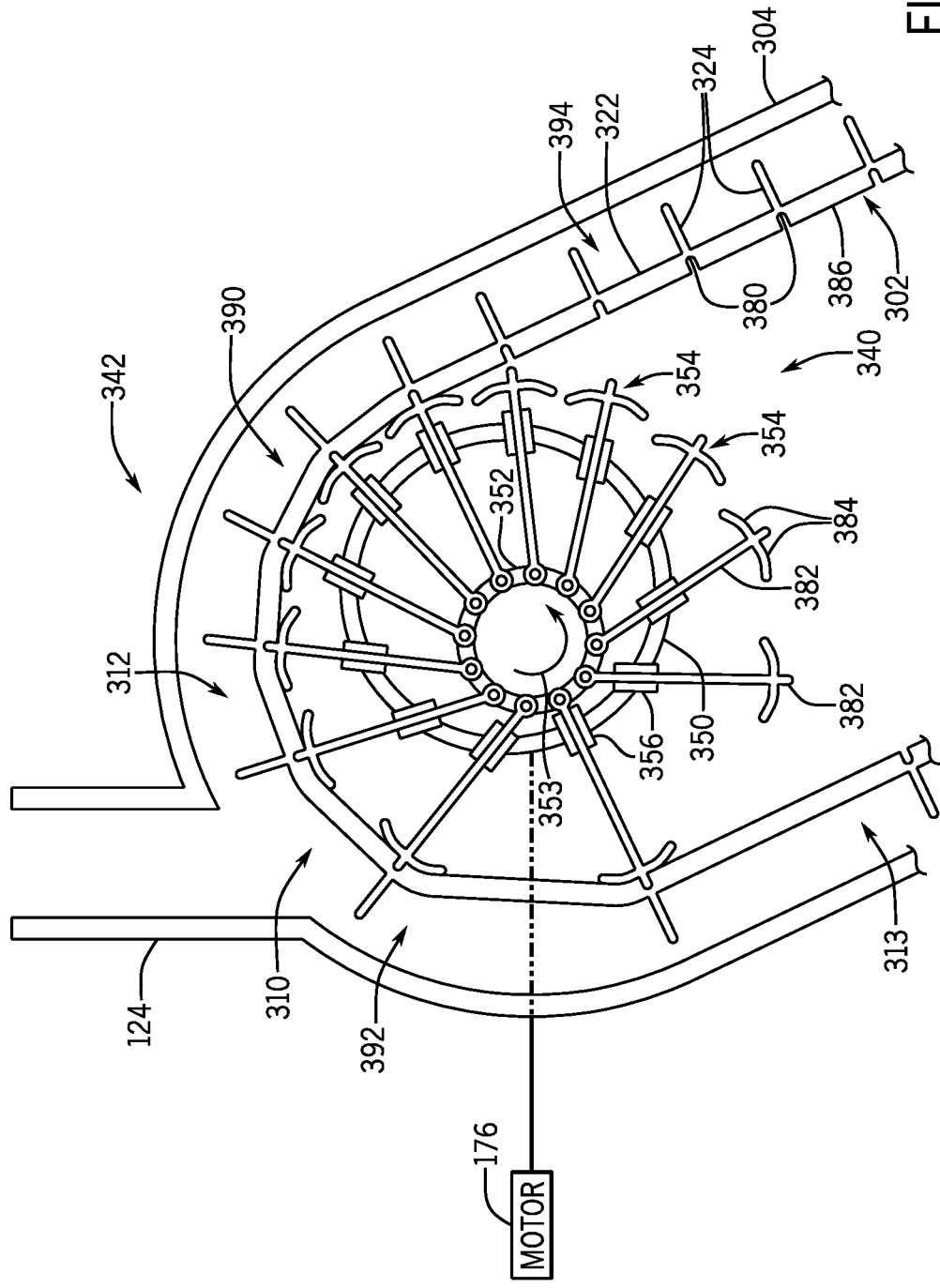
FIG. 8 is a side view of an embodiment a particle belt and a hub assembly of a particle delivery system that may be employed within the row unit of FIG. 2, in accordance with an aspect of the present disclosure.

FIG. 8 is a side view of the particle belt 302 and the first hub assembly 340 of the particle delivery system of FIG. 7. As described above, the outer hub 350 and the inner hub 352 are configured to rotate, as indicated by arrow 353, to drive rotation of the particle belt 302. For example, the second motor 176 is configured to drive rotation of the outer hub 350, thereby driving rotation of the first hub assembly 340 and the particle belt 302. Additionally, a substantially no-slip condition exists between the particle belt 302 and the first hub assembly 340 at the first location 342 and between the particle belt 302 and the second hub assembly at the second location. The substantially no-slip conditions enable the first hub assembly 340 and the second hub assembly to stretch the particle belt 302 at/along the particle acceleration section 312, thereby accelerating the particles 80 at/along the particle acceleration section 312.

The particle belt 84 has recesses 380 formed along the base 322 and configured to receive the cogs 354 of the first hub assembly 340. The interface between the cogs 354 and the recesses 380 (e.g., the cogs 354 extending into the recesses 380) provides the no-slip condition at the first location 342. For example, as the first hub assembly 340 rotates, as indicated by arrow 353, the cogs 354 may rotate/move at the same speed as the particle belt 302. As illustrated, each cog 354 includes a member 382 and arms 384 (e.g., two arms 384) extending from the member 382. The member 382 is coupled to the inner hub 352 and is configured to extend into a respective recess 380 of the base 322 of the particle belt 302, and each arm 384 is configured to abut a rear surface 386 of the base 322 of the particle belt 302.

As the outer hub 350 and the inner hub 352 rotate, as indicated by arrow 353, the first hub assembly 340 gradually stretches the particle belt 302. For example, the cogs 354 first engage the particle belt 302 at a first area 390 of the first location 342. As the outer hub 350 and the inner hub 352 rotate, the cogs 354 rotate from the first area 390 of the first location 342 to a second area 392 of the first location 342. Because the inner hub 352 is disposed eccentrically within the outer hub 350, a spacing between adjacent cogs 354 (e.g., between the arms 384 of adjacent cogs 354) increases, and the cogs 354 accelerate as the cogs 354 rotate from the first area 390 toward the second area 392. The increased spacing between the cogs 354 causes the particle belt 302 to gradually stretch as the particle belt 302 rotates, thereby accelerating the particles 80. As illustrated, the particle engagement point 310 is disposed generally between the first area 390 and the second area 392. In certain embodiments, the particle engagement point 310 may be disposed at the first area 390, at the second area 392, or at a third area 394 of the particle belt 302 prior to the first area 390 (e.g., a retracted portion of the particle belt 302).

As described above, the second hub assembly of the particle delivery system is configured to gradually retract the particle belt as the particle belt moves along the second hub assembly. For example, the cogs of the second hub assembly may first engage the recesses of the particle belt at a first area of the second location and may rotate toward a second area of the second location (e.g., via rotation of the outer hub and the inner hub of the second hub assembly). As the outer hub and the inner hub of the second hub assembly rotate, a spacing between the adjacent cogs may gradually decrease due to the inner hub being disposed eccentrically within the outer hub, thereby gradually retracting the particle belt as the particle belt moves along the second hub assembly (e.g., from the first area of the second location toward the second area of the second location).

Figure 9:
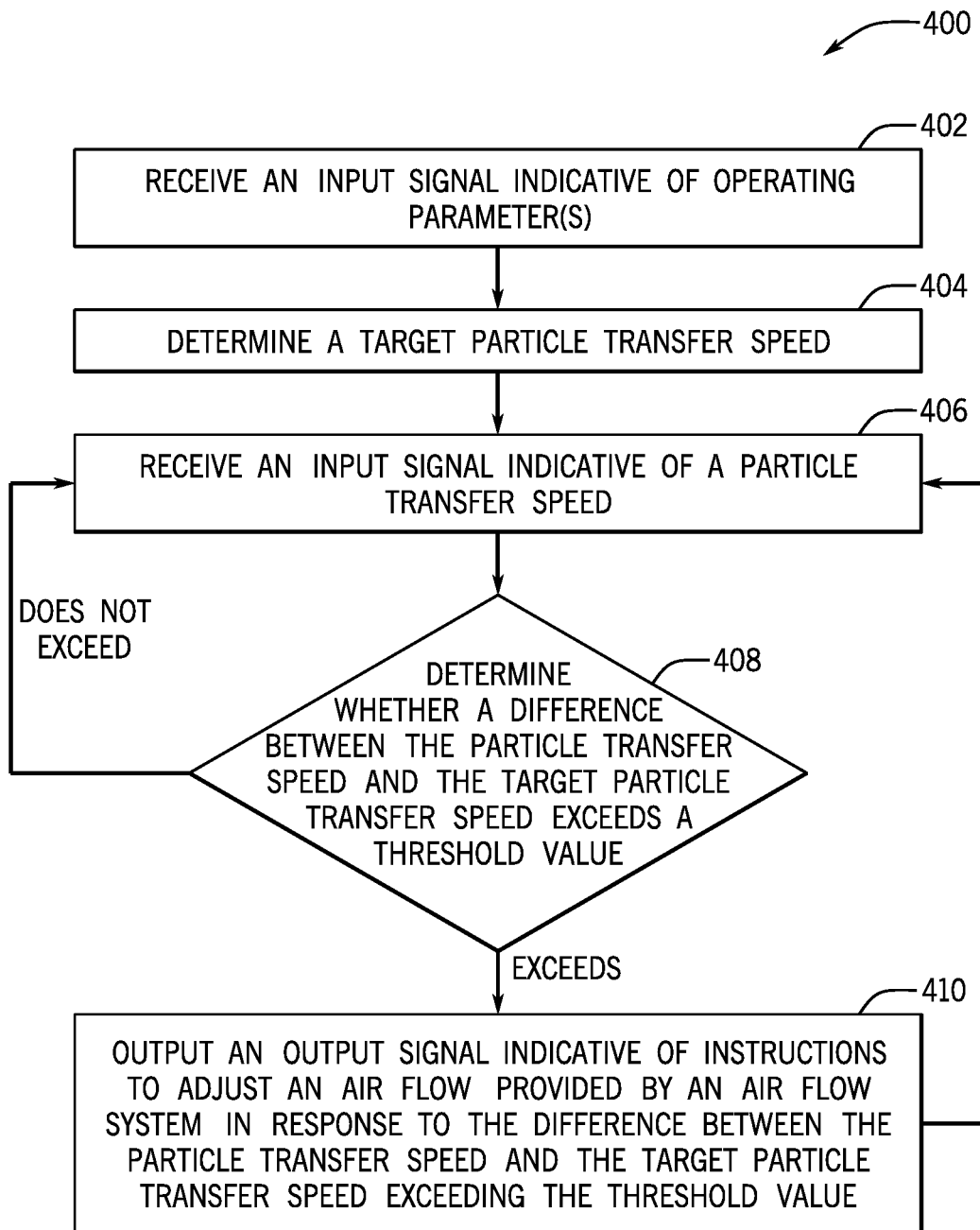
FIG. 9 is a flow diagram of an embodiment of a process for controlling a particle delivery system, in accordance with an aspect of the present disclosure.

FIG. 9 is a flow diagram of an embodiment of a process 400 for controlling a particle delivery system. The process 400, or portions thereof, may be performed by the controller of the particle delivery system. The process 400 begins at block 402, in which an input signal indicative of operating parameter(s) is received. For example, the operating parameters may include the type of the particles, the ground speed of the row unit, a spacing between the flights the particle belt, the size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 404, the target particle transfer speed is determined. For example, the controller may determine the target particle transfer speed of the particles based on the type of the particles, the belt speed of the particle belt (e.g., the particle belt having the particle engagement section/point configured to receive the particles traveling at the particle transfer speed), the spacing between flights of the particle belt, the size of the particles, and/or other operating parameters. At block 406, an input signal indicative of the particle transfer speed of the particle at the particle engagement section/point of the particle belt is received. For example, the controller may receive the input signal indicative of the particle transfer speed from the particle sensor disposed proximate to the particle engagement section/point. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the particle engagement section/point. As such, the controller may account for variance among the particle transfer speeds of multiple particles at the particle engagement section/point to reduce excessive control actions (e.g., adjustments to the flow rate of the air flow provided by the air flow system).

At block 408, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the belt speed of the particle belt. In response to the difference exceeding the threshold, the process 400 proceeds to block 410. In response to the difference not exceeding the threshold, the process 400 returns to block 406 and receives the next input signal indicative of the particle transfer speed.

At block 410, in response to the difference between the particle transfer speed and the target particle transfer speed exceeding the threshold value, an output signal indicative of instructions to adjust the flow rate of the air flow provided by the air flow system is output by the controller. For example, the controller may output the output signal indicative of instructions to increase the flow rate of the air flow provided by the air flow system in response to a determination that the particle transfer speed is less than the target particle transfer speed and the difference between the particle transfer speed and the target particle transfer speed exceeds the threshold value, or the controller may output the output signal indicative of instructions to decrease the flow rate of the air flow provided by the air flow system in response to a determination that the particle transfer speed is greater than the target particle transfer speed and the difference between the particle transfer speed and the target particle transfer speed exceeds the threshold value.

After completing block 410, the process 400 returns to block 406 and receives the next input signal indicative of the particle transfer speed of the particle at the particle engagement section/point of the particle belt. The next determination is made of whether the difference between the particle transfer speed and the target particle transfer speed exceeds the threshold value (e.g., block 408), and the flow rate of the air flow may be adjusted in response to the determination. As such, blocks 406-410 of the process 400 may be iteratively performed (e.g., by the controller of the particle delivery system and/or by another suitable controller) to facilitate acceleration of the particles to the target particle transfer speed and transfer of the particles from the particle disc to the particle belt. In some embodiments, certain blocks of the blocks 402-410 may be omitted from the process 400, and/or the order of the blocks 402-410 may be different.

Figure 10:
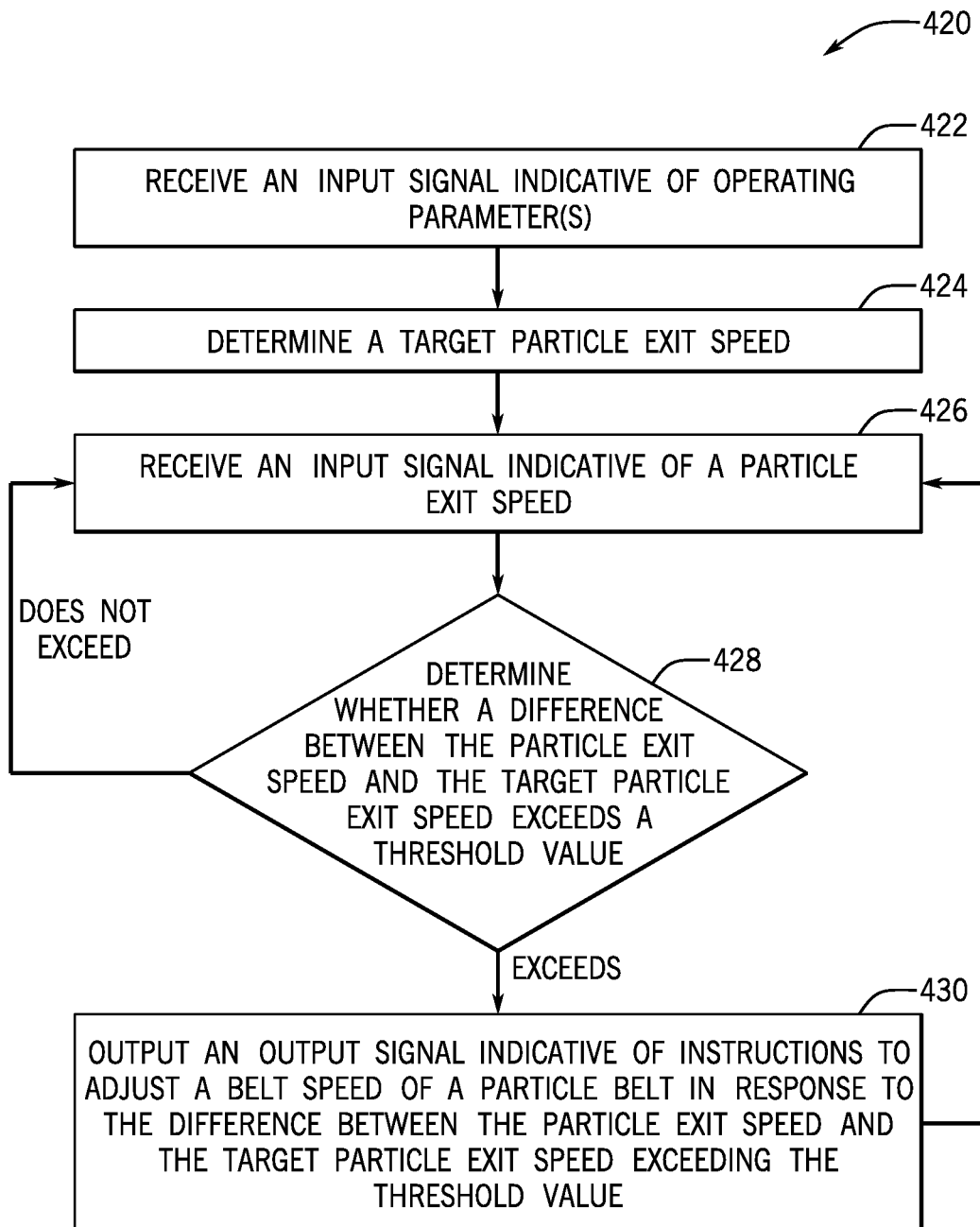
FIG. 10 is a flow diagram of an embodiment of a process for controlling a particle delivery system, in accordance with an aspect of the present disclosure.

FIG. 10 is a flow diagram of an embodiment of a process 420 for controlling a particle delivery system. The process 420, or portions thereof, may be performed by the controller of the particle delivery system. The process 420 begins at block 422, in which an input signal indicative of operating parameter(s) is received. For example, the operating parameters may include the type of the particles, the ground speed of the row unit, a spacing between flights of one or more particle belts, a size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 424, the target particle exit speed is determined. For example, the controller may determine the target particle exit speed of the particles based on the type of the particles, the ground speed of the row unit, the size of the particles, and/or other operating parameters. At block 426, an input signal indicative of the particle exit speed of the particle at the particle exit section of the particle belt is received. For example, the controller may receive the input signal indicative of the particle exit speed from the particle sensor disposed proximate to the particle exit section of the particle belt. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the particle exit section. As such, the controller may account for variance among the particle exit speeds of multiple particles at the particle exit section to reduce excessive control actions (e.g., adjustments to the belt speed of the particle belt).

At block 428, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 420 proceeds to block 430. In response to the difference not exceeding the threshold, the process 420 returns to block 426 and receives the next input signal indicative of the particle exit speed.

At block 430, in response to the difference between the particle exit speed and the target particle exit speed exceeding the threshold value, an output signal indicative of instructions to adjust the belt speed of the particle belt is output to the motor configured to drive rotation of the particle belt (e.g., the motor configured to drive rotation of the wheel coupled to and configured to drive rotation of the particle belt and/or the hub assembly coupled to and configured to drive rotation of the particle belt). For example, the controller may output the output signal indicative of instructions to increase the belt speed of the particle belt in response to a determination that the particle exit speed is less than the target particle exit speed and the difference between the particle exit speed and the target particle exit speed exceeds the threshold value. Further, the controller may output the output signal indicative of instructions to decrease the belt speed of the particle belt in response to a determination that the particle exit speed is greater than the target particle exit speed and the difference between the particle exit speed and the target particle exit speed exceeds the threshold value.

After completing block 430, the process 420 returns to block 426 and receives the next input signal indicative of the particle exit speed of the particle at the particle exit section of the particle belt. The next determination is made of whether the difference between the particle exit speed and the target particle exit speed exceeds the threshold value (e.g., block 428), and the belt speed of the particle belt may be adjusted in response to the determination. As such, blocks 426-430 of the process 420 may be iteratively performed (e.g., by the controller of the particle delivery system and/or by another suitable controller) to facilitate acceleration of the particles to the target particle exit speed. In some embodiments, certain blocks of the blocks 422-430 may be omitted from the process 420, and/or the order of the blocks 422-430 may be different.

Embodiments of a particle delivery system described herein may facilitate deposition of particles into a trench in soil. The particle delivery system may be configured to accelerate the particles downwardly toward the trench and to provide particular spacings between the particles along the trench. For example, the particle delivery system may include a particle disc configured to meter individual particles, thereby establishing a particular spacing between particles. The particle disc may be configured to release the particles from a release point of the particle disc. A particle belt of the particle delivery system may be configured to receive the particles from the particle disc and to expel the particles toward the trench in the soil. In certain embodiments, a particle acceleration section of the particle belt may be stretched, such that a particle exit speed of the particles exiting a particle exit section of the particle belt reaches a target particle exit speed (e.g., after the particles pass through the particle acceleration section and are expelled from the particle belt at the particle exit section). The particle belt may accelerate the particles to a speed greater than a speed resulting from gravitational acceleration alone. As such, the particle delivery system may enable the row unit to travel faster than traditional row units that utilize seed tubes, which rely on gravity to accelerate the particles (e.g., seeds) for delivery to soil. Additionally, the particle belt may accelerate the particles such that the particle delivery system reduces the relative ground speed of the particles, thereby enabling the particle delivery system to accurately deposit the particles within the trench in soil.

In certain embodiments, the particle delivery system may include wheel(s) engaged with the particle belt and configured to rotate at different rotational speeds to stretch the particle belt at the particle acceleration section and to accelerate the particles. For example, the wheels may be engaged with the particle belt, and a substantially no-slip condition may exist between each wheel and the particle belt. In some embodiments, the particle delivery system may include hub assembly(ies) engaged with the particle belt and configured to stretch the particle belt at the particle acceleration section to accelerate the particles. For example, the hub assemblies may be engaged with the particle belt, and a substantially no-slip condition may exist between each hub assembly and the particle belt. Each hub assembly may include an outer hub configured to rotate, an inner hub disposed eccentrically within the outer hub and configured to rotate with the outer hub, cogs coupled to the inner hub and configured to pivot relative to the inner hub as the inner hub and the outer hub rotate, and guides coupled to respective cogs and to the outer hub. Each guide may be configured to slide along the respective cog and along the outer hub as the inner hub and the outer hub rotate, and each cog may be configured to engage the particle belt, such that the rotation of the inner hub and the outer hub and the pivoting of each cog stretches the particle belt.

Additionally, features of certain embodiments of the particle delivery systems described herein may be combined with features of other embodiments. For example, the first wheel and/or the second wheel of FIGS. 3-5 may be included in the particle delivery system of FIG. 6. In certain embodiments, the first wheel and/or the second wheel of FIG. 6 may be included in the particle delivery system of FIG. 3. In some embodiments, the first wheel and/or the second wheel of FIGS. 3-6 may be included in the particle delivery system of FIGS. 7 and 8. In certain embodiments, the belt tension assembly of FIG. 3 may be included in the particle delivery system of FIG. 7. In some embodiments, the drive mechanism(s) of FIGS. 5 and/or 6 may be included in the particle delivery system of FIG. 7. In certain embodiments, the first hub assembly and/or the second hub assembly of FIGS. 7 and 8 may be included in the particle delivery system of FIG. 3. Additionally or alternatively, the embodiments of the particle delivery systems described herein, or portions thereof, may be combined in other suitable manners.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery system of an agricultural row unit, comprising:
   a particle belt having a particle acceleration section, wherein the particle belt is configured to receive a particle from a particle metering and singulation unit, to accelerate the particle at the particle acceleration section, and to expel the particle toward a trench in soil;
   a first wheel engaged with the particle belt at a first location; and
   a second wheel engaged with the particle belt at a second location, wherein the particle acceleration section extends between the first location and the second location, a substantially no-slip condition exists between the first wheel and the particle belt at the first location and between the second wheel and the particle belt at the second location, and the second wheel is configured to rotate faster than the first wheel to accelerate the particle at the particle acceleration section.

2. The particle delivery system of claim 1, wherein the particle belt comprises a base and a plurality of flights having pairs of opposing flights extending from the base, and each pair of opposing flights of the plurality of flights is configured to receive the particle from the particle metering and singulation unit.

3. The particle delivery system of claim 2, wherein each of the first wheel and the second wheel comprises a plurality of protrusions, the base comprises a plurality of recesses, and each recess of the plurality of recesses is configured to receive a respective protrusion of the plurality of protrusions of the first and second wheels to establish the substantially no-slip condition at the first location and at the second location.

4. The particle delivery system of claim 2, wherein the base of the particle belt comprises an elastic material configured to stretch and relax.

5. The particle delivery system of claim 1, wherein at least one of the first wheel and the second wheel comprises a pulley or a gear.

6. The particle delivery system of claim 1, wherein the first wheel and the second wheel are configured to drive rotation of the particle belt.

7. The particle delivery system of claim 1, comprising a drive mechanism coupled to the first wheel and the second wheel, wherein the drive mechanism is configured to be driven by the first wheel rotating at a first rotational speed, and the drive mechanism is configured to drive rotation of the second wheel at a second rotational speed proportional to the first rotational speed.

8. The particle delivery system of claim 7, wherein the drive mechanism comprises a chain, a belt, or a beveled gear.

9. A particle delivery system of an agricultural row unit, comprising:
   a particle belt having a particle acceleration section, wherein the particle belt is configured to receive a particle from a particle metering and singulation unit, to accelerate the particle at the particle acceleration section, and to expel the particle toward a trench in soil;
   a first wheel engaged with the particle belt at a first location and at a first end of the first wheel;
   a second wheel engaged with the particle belt at a second location and at a first end of the second wheel, wherein the particle acceleration section extends between the first location and the second location, and a substantially no-slip condition exists between the first wheel and the particle belt at the first location and between the second wheel and the particle belt at the second location; and
   a drive mechanism coupled to a second end of the first wheel and a second end of the second wheel, wherein the drive mechanism is configured to be driven by the first wheel rotating at a first rotational speed, and the drive mechanism is configured to drive rotation of the second wheel at a second rotational speed faster than and proportional to the first rotational speed to accelerate the particle at the particle acceleration section.

10. The particle delivery system of claim 9, wherein a first diameter of the second end of the first wheel is larger than a second diameter of the second end of the second wheel.

11. The particle delivery system of claim 9, wherein the particle belt has a particle engagement section at the first location, and the particle belt is configured to receive the particle from the particle metering and singulation unit at the particle engagement section.

12. The particle delivery system of claim 9, wherein the particle belt has a particle exit section at the second location, and the particle belt is configured to expel the particle toward the trench in the soil at the particle exit section.

13. The particle delivery system of claim 9, wherein the first wheel and the second wheel are configured to drive rotation of the particle belt.

14. The particle delivery system of claim 9, wherein at least one of the first wheel and the second wheel comprises a pulley or a gear.

15. The particle delivery system of claim 9, wherein the drive mechanism comprises a chain, a belt, or a beveled gear.

16. A particle delivery system of an agricultural row unit, comprising:
   a particle belt having a particle acceleration section and a particle exit section, wherein the particle belt is configured to receive a particle from a particle metering and singulation unit, to accelerate the particle at the particle acceleration section, and to expel the particle toward a trench in soil at the particle exit section;
   a first wheel engaged with the particle belt at a first location;
   a second wheel engaged with the particle belt at a second location, wherein the particle acceleration section extends between the first location and the second location, a substantially no-slip condition exists between the first wheel and the particle belt at the first location and between the second wheel and the particle belt at the second location, and the second wheel is configured to rotate faster than the first wheel to accelerate the particle at the particle acceleration section; and a controller comprising a memory and a processor, wherein the controller is configured to:
  receive an input signal indicative of a particle exit speed of the particle at the particle exit section of the particle belt; and
  output an output signal indicative of instructions to adjust a belt speed of the particle belt at the particle exit section, such that a difference between the particle exit speed and a target particle exit speed is less than a threshold value.

17. The particle delivery system of claim 16, comprising a drive mechanism coupled to the first wheel and the second wheel, wherein the drive mechanism is configured to be driven by the first wheel rotating at a first rotational speed, and the drive mechanism is configured to drive rotation of the second wheel at a second rotational speed proportional to the first rotational speed.

18. The particle delivery system of claim 17, comprising a motor configured to drive rotation of the first wheel, wherein the motor is communicatively coupled to the controller.

19. The particle delivery system of claim 18, wherein the controller is configured to output the output signal to the motor indicative of instructions to increase the belt speed of the particle belt in response to determining that the particle exit speed is less than the target particle exit speed and the difference between the particle exit speed and the target particle exit speed exceeds the threshold value, and the output signal causes the motor to increase the first rotational speed of the first wheel.

20. The particle delivery system of claim 18, wherein the controller is configured to output the output signal to the motor indicative of instructions to decrease the belt speed of the particle belt in response to determining that the particle exit speed is greater than the target particle exit speed and the difference between the particle exit speed and the target particle exit speed exceeds the threshold value, and the output signal causes the motor to decrease the first rotational speed of the first wheel.

* * * * *